(12) United States Patent
Mimatsu

(10) Patent No.: US 7,899,793 B2
(45) Date of Patent: Mar. 1, 2011

(54) MANAGEMENT OF QUALITY OF SERVICES IN STORAGE SYSTEMS

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 12/007,291

(22) Filed: Jan. 9, 2008

(65) Prior Publication Data

US 2009/0177721 A1    Jul. 9, 2009

(51) Int. Cl.
   *G06F 17/30*    (2006.01)
(52) U.S. Cl. .................. 707/661; 707/663; 707/662; 707/665; 707/667; 707/668
(58) Field of Classification Search .............. 707/661, 707/662, 663, 665, 667, 666, 668
   See application file for complete search history.

(56) References Cited

U.S. PATENT DOCUMENTS

| | | | |
|---|---|---|---|
| 7,039,701 B2 * | 5/2006 | Wesley | 709/224 |
| 7,069,318 B2 * | 6/2006 | Burbeck et al. | 709/224 |
| 7,143,139 B2 * | 11/2006 | Burbeck et al. | 709/206 |
| 7,155,466 B2 | 12/2006 | Rodriguez et al. | |
| 7,177,929 B2 * | 2/2007 | Burbeck et al. | 709/224 |
| 7,181,536 B2 * | 2/2007 | Burbeck et al. | 709/245 |
| 7,251,689 B2 * | 7/2007 | Wesley | 709/224 |
| 7,315,826 B1 * | 1/2008 | Guheen et al. | 705/7 |
| 7,558,850 B2 * | 7/2009 | Chambliss et al. | 709/224 |
| 2002/0059274 A1 * | 5/2002 | Hartsell et al. | 707/100 |
| 2002/0095400 A1 * | 7/2002 | Johnson et al. | 707/1 |
| 2009/0132543 A1 * | 5/2009 | Chatley et al. | 707/10 |
| 2009/0138480 A1 * | 5/2009 | Chatley et al. | 707/10 |
| 2009/0138481 A1 * | 5/2009 | Chatley et al. | 707/10 |
| 2009/0144224 A1 * | 6/2009 | Phan et al. | 707/1 |
| 2009/0144284 A1 * | 6/2009 | Chatley et al. | 707/10 |
| 2009/0144285 A1 * | 6/2009 | Chatley et al. | 707/10 |
| 2009/0144300 A1 * | 6/2009 | Chatley et al. | 707/100 |
| 2009/0144416 A1 * | 6/2009 | Chatley et al. | 709/224 |
| 2009/0144422 A1 * | 6/2009 | Chatley et al. | 709/226 |

* cited by examiner

*Primary Examiner*—Jean M Corrielus
(74) *Attorney, Agent, or Firm*—Mattingly & Malur, P.C.

(57) ABSTRACT

A plurality of data elements are stored on storage devices in a storage system and are identified by unique identifiers. Each data element has management information associated therewith for enabling management of a quality of service of each data element individually. The management information is individually changeable for each data element for changing the quality of service of each data element individually without affecting the quality of service of others of the data elements. The quality of service of a particular data element can be changed as a result of the storage system receiving a WRITE request sent to the storage system, the WRITE request being directed to a virtual metadata file corresponding to the particular data element and specifying a new quality of service for the particular data element or specifying custom metadata for the particular data element.

18 Claims, 22 Drawing Sheets

Structure of Data File System

Structure of Metadata File System

| Data ID | Internal path | Creation time | Retention period | Hash value | Custom metadata | Digital signature | Retention policy | Digital signature policy | Hash verification policy | Custom metadata policy | Indexing policy | Digital Signature flag | Index flag |
|---|---|---|---|---|---|---|---|---|---|---|---|---|---|
| 2001 | 2002 | 2003 | 2004 | 2005 | 2006 | 2007 | 2008 | 2009 | 2010 | 2011 | 2012 | 2013 | 2014 |
| /doc/a.txt | /doc/a.txt | time1 | 1 year | H1 | XXX | N/A | 1 year | NO | 1 | 1 MB | NO | YES | YES |
| /b.html | /b.html | time3 | 3 year | H2 | N/A | DS2 | 5 year | YES | 30 | 0 MB | YES | NO | NO |
| ... | | | | | | | | | | | | | |

Metadata Table 1301

FIG. 3

| User ID | Default retention period 4002 | Default retention policy 4003 | Default digital signature policy 4004 | Default hash verification policy 4005 | Default custom metadata policy 4006 | Default indexing policy 4007 |
|---|---|---|---|---|---|---|
| user1 | 1 year | 1 year | NO | 1 | 1 MB | NO |
| user2 | 3 year | 5 year | YES | 30 | 0 MB | YES |
| ... | | | | | | |

Default Policies Table 1302

| Keyword | Data ID |
|---|---|
| ABC | /doc/a.txt |
| | /b.htm |
| | ... |
| DEF | /doc/a.txt |
| | ... |
| ... | |

Search Index

FIG. 6

Processing of Write Request To Data 7006

Processing of Write Request to Metadata 7008

Processing of Write Request to Metadata 7008 (cont.)

Processing of Write Request to Metadata 7008 (cont.)

Processing of Read Request 7010

Processing of Read Request 7010 (cont.)

Processing of Delete Request 7011

Processing of Export Request 7018

Processing of Import Request 7019

Background Hash Verification Process

Background Digital Signature Process

Background Indexing Process

| Pool ID / 17001 | Default retention period / 4002 | Default retention policy / 4003 | Default digital signature policy / 4004 | Default hash verification policy / 4005 | Default custom metadata policy / 4006 | Default indexing policy / 4007 |
|---|---|---|---|---|---|---|
| /doc | 1 year | 1 year | NO | 1 | 1 MB | NO |
| / | 3 year | 5 year | YES | 30 | 0 MB | YES |
| ... | | | | | | |

Default Policies Table of the Second Embodiments

FIG. 17

| Data ID /2001 | Pool ID /18001 | Internal path /2002 | Creation time /2003 | Retention period /2004 | Hash value /2005 | Custom metadata /2006 | Digital signature /2007 | Retention policy /2008 | Digital signature policy /2009 | Hash verification policy /2010 | Custom metadata policy /2011 | Indexing policy /2012 | Digital Signature flag /20013 | Index flag /20014 |
|---|---|---|---|---|---|---|---|---|---|---|---|---|---|---|
| /doc/a.txt | /doc | /doc/a.txt | time1 | 1 year | H1 | XXX | N/A | 1 year | NO | 1 | 1 MB | NO | YES | YES |
| /b.html | / | /b.html | time3 | 3 year | H2 | N/A | DS2 | 5 year | YES | 30 | 0 MB | YES | NO | NO |
| ... | | | | | | | | | | | | | | |

Metadata Table 2301 of the Second Embodiments

FIG. 18

Processing of Search Request 7021

MANAGEMENT OF QUALITY OF SERVICES IN STORAGE SYSTEMS

BACKGROUND OF THE INVENTION

1. Field of the Invention

The present invention relates generally to computer storage and information systems.

2. Description of Related Art

According to recent trends, ever-increasing amounts of digital data are being stored in computer storage systems, such as disk array systems, which use magnetic disk drives to store large quantities of data. For example, a digital archive storage system must store substantial amounts of digital data, such as email, user files, images of bank checks, medical X-ray images, and so on, for various purposes, such as meeting regulatory compliance standards, guarding against legal action, or the like. When a company needs to manage massive quantities of data of this nature over a long period time, special purpose storage systems for data archiving are often used to reduce total data management costs.

These archive storage systems have several management functions to store and manage a large amount of data safely over long periods of time. For example, some archive storage systems are able to search data which contains keywords specified by users, prevent data from being deleted or altered, and detect data corruption caused by degradation of the storage media during long-term retention. Some archive storage systems also enable exporting or importing contents of the archives to or from an external system, such as a backup system. Such systems may include a digital signature that ensures that the content imported to the external system or imported to the archive system has not been altered since the content was originally exported from the archive system or exported from the external system, respectively.

Related art includes U.S. Pat. No. 7,155,466, to Rodriguez et al., entitled "Policy-Based Management of a Redundant Array of Independent Nodes," the entire disclosure of which is incorporated herein by reference.

BRIEF SUMMARY OF THE INVENTION

The invention includes methods and apparatuses for managing the quality of service of data in storage systems. Embodiments of the invention control quality of services related to data storage by accessing and controlling metadata of each individual data element stored in the storage system. The invention is able to change the quality of data management services in a storage system for each discrete element or unit of data, such as a data file, data object, data group or data pool. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates an exemplary data structure of a metadata table.

FIG. 4 illustrates an exemplary data structure of a default policies table.

FIG. 6 illustrates an exemplary data structure of a search index.

FIG. 17 illustrates an exemplary data structure of a default policies table of the second embodiments.

FIG. 18 illustrates an exemplary data structure of a metadata table of the second embodiments.

DETAILED DESCRIPTION OF THE INVENTION

Figure 1:
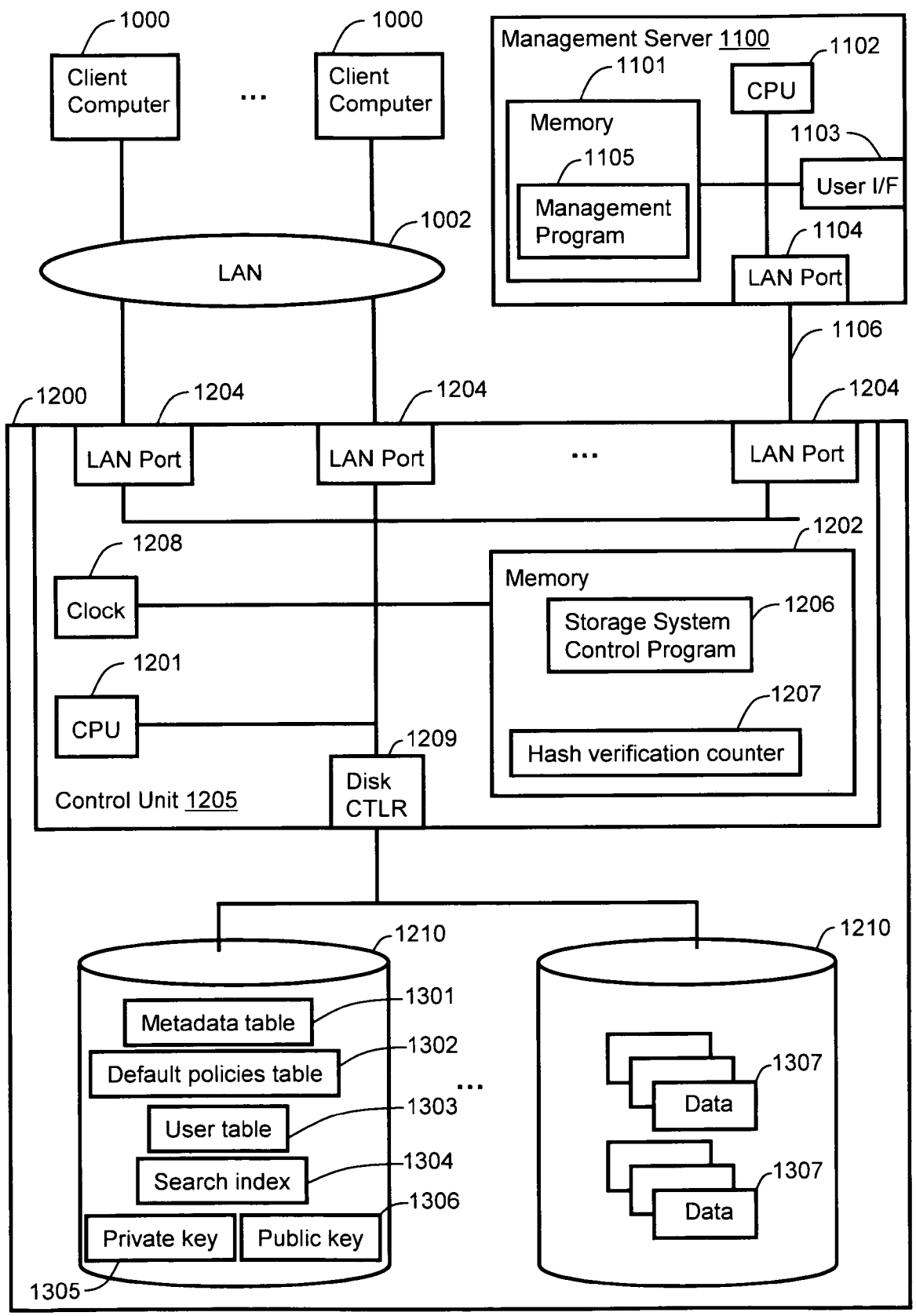
FIG. 1 illustrates an example of a hardware configuration in which the method and apparatus of the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, it should be noted that, while the detailed description provides various embodiments, as described below and as illustrated in the drawings, the present invention is not limited to the embodiments described and illustrated herein, but can extend to other embodiments, as would be known or as would become known to those skilled in the art. Additionally, the drawings, the foregoing discussion, and following description are exemplary and explanatory only, and are not intended to limit the scope of the invention or this application in any manner.

Embodiments of the invention, as will be described in greater detail below, provide an apparatus, method and computer program, for managing data in computer storage systems. For example, when the storage system is shared by multiple clients, each of which have different requirements for archiving, the quality of the services provided for each client can be adjusted based on the requirements of the individual clients, so that multiple and custom service sets are available to meet the requirements of the various clients. In some embodiments of the invention, a storage service provider (SSP) may provide an archive storage system that is shared by multiple clients, and the service level provided to each client is able to be adjusted according to the contract with the client, for instance, according to an amount of payment or a service level agreement (SLA).

In embodiments of the invention, a storage system maintains metadata which defines the quality of services enabled for each data element, such as for each individual file in the case of storage that uses a file system. When the storage system applies data management functions to a particular data element, the storage system adjusts the quality of services applied to that particular data element by referring to metadata that has been created for the particular data element. Default values of the metadata for a particular data are defined for each client who created or owns the data, or for each data group or pool to which the particular data belongs. These metadata can be read by storage clients to enable the clients to determine particular metadata values being applied to their data. The metadata also can be modified by clients who have privileges to set the metadata to values other than default values.

The management functions of the storage system of the invention may utilize management information (i.e., metadata) which is stored/managed by the storage system or clients of the storage system, such as archive applications, or the like. The metadata may be associated with each identified discrete piece or element of data stored in the storage system, such as a data file, a data object, a data pool, or the like. For example, a search function is able to maintain a search index which contains keywords extracted from data and/or metadata. This function may utilize metadata set by clients in order to specify keywords used to search the data for locating particular data. This is especially useful when the data is non-text data, such as an image, a video file, or a sound file, or the like, that contains no keyword in the data itself. To make this kind of data searchable, a client can set an associated metadata which contains searchable text, such as a name, title, category or description of the data. Such metadata, which may be arbitrary information set by clients, is called "custom metadata".

A retention management function utilizes another type of metadata, which contains a retention period during which the archive storage system will not delete or alter the associated data. Additionally, to detect data corruption, the storage system utilizes another type of metadata which contains a calculated value or pattern that represents the content of the particular data. When a data is created or first saved in the storage system, the storage system stores this hash value metadata, which is calculated by a cryptographic hash function, such as MD5, SHA1, or SHA256. The storage system the periodically re-calculates the hash value of the stored data and compares the newly-calculated value with the value previously stored as metadata. By detecting whether there is a difference between the two values, the storage system can perceive whether the data has been corrupted or otherwise had the content changed since the time that the original data was first created or stored. Additionally, with respect to an import and export function, a digital signature of the data can also be stored as one type of metadata.

Metadata can be associated with data and accessed by clients in several ways. For example, if the storage system has a file system interface, files of data and metadata can be associated by a rule based on naming of path and file name. On the other hand, if the storage system is CAS (Content Addressed Storage), data and metadata can be handled simply as one object via an API (Application Program Interface) provided by a library installed in client computers. By implementing the services described above, a storage system, such as an archive storage system, is able to effectively retain a massive archive of data. Such a storage system can store archive data of different people, organizations, or applications in a single storage system efficiently and without conflicts, while providing customized quality of service to the data of each different client.

First Embodiments

In some embodiments, the storage system of the invention provides services for searching data and custom metadata, preventing data from alteration or deletion for a specified time period, detecting data corruption, and importing or exporting data and metadata along with a digital signature. For each service provided, the storage system maintains metadata which defines the quality of service for each individual data element, such as a retention period for the data, frequency with which hash verification is performed for the data, a digital signature policy for the data, whether custom metadata is allowed, and if so, what amount of custom metadata, an indexing policy for the data, and the like. Default values of the metadata are determined based on the owner/user of the data. Also, permissions to modify the metadata for specifying quality of service are defined within the storage system for each user.

System Architecture

FIG. 1 illustrates an overview of an exemplary architecture of an information system in which the method and apparatus of the invention may be applied. In FIG. 1, one or more client computers 1000 are connected for communication with a storage system 1200 via a local area network (LAN) 1002. Client computers 1000 are able to access data and/or metadata stored in the storage system 1200 by issuing input/output (I/O) operations or requests to storage system 1200 via LAN 1002. For example, in this embodiment, the storage system has a file system interface, so that the I/O requests may be issued via a standard NFS (Network File System) or CIFS (Common Internet File System) protocol, and may contain a path and file name to specify data and/or metadata which are stored as files. The I/O operations contain a command and specify a file system, a path and a file name for identifying an operation, data and/or metadata to be accessed, and a user identifier (ID) of the requester. In this embodiment, the I/O operations may be a WRITE, a READ, or a DELETE command. User ID is a unique identifier assigned to each user of the system like "UID" in a Unix environment. If each user has its own client computer, IP address also can be used as the user ID. Furthermore, in other embodiments, if the storage system is a CAS system, the I/O requests may contain a content address and may be issued via an API (Application Program Interface) provided by a library installed in the client computers 1000. This invention is applicable to both of these storage system types and other storage systems known in the art.

Storage system 1200 is managed by an administrator from a management server 1100. Management server 1100 has a CPU 1102 which executes a management program 1105 stored in a memory 1101. The administrator uses management program 1105 to manage storage system 1200 by communication through a user interface (I/F) 1103. Management server 1100 includes a LAN port 1104 for connecting management server 1100 for communication with storage system 1200 via a LAN cable 1106 or via LAN 1002. Thus, LAN 1106 can be unified with LAN 1002, or may be separate there from. Further, LAN 1002 may be any kind of network for enabling communication, such as Ethernet, wireless, or the like.

Under the invention, the administrator typically sends five types of requests to storage system 1200: READ, UPDATE, EXPORT, IMPORT, and SEARCH requests. The READ request reads a default policies table 1302 and user table 1303 (described further below) in storage system 1200. The administrator is able to use user I/F 1103 to cause management program 1105 to set or modify the default policies table 1210, and can send an UPDATE request to update these tables in the storage system with new policies. Further, to extract a package of data and metadata from storage system 1200, the administrator sends an EXPORT request which specifies the data to be extracted. Similarly, a package of data and metadata can be imported into the storage system 1200 by using an IMPORT request. A SEARCH request, which includes keywords, is used to search for data and/or metadata which contain the keywords specified in the request.

Storage system 1200 has a control unit 1205 that includes a CPU 1201, a memory 1202 and one or more LAN ports 1204 to enable communication with client computers 1000 and management server 1100. Storage system 1200 also includes one or more data storage devices, such as disk drives 1210, in communication with control unit 1205 via a disk controller 1209, and which are used to store data elements 1307, and other data structures and data discussed below. The storage system can be equipped with a large number of disk drives 1210, but, for simplicity of illustration only two disk drives 1210 are illustrated in this embodiment. Further, while the data storage devices of the invention are characterized as disk drives, they may alternatively be solid state storage devices, optical storage devices, or the like. A hash verification counter 1207 may also be included for selecting data to be verified in each repeated process when checking for data corruption by carrying out the hash verification, as discussed further below.

CPU 1201 executes a storage system control program 1206 stored in memory 1202, or stored in other computer readable medium. Storage system control program 1206 not only processes I/O operations, such as READ and WRITE requests sent from clients, but also executes background processes of hash verification, digital signature management, and data and metadata indexing, as is discussed further below. The timing of execution of the background processes and retention of data is determined by referring to a clock 1208 which provides the current time. Storage system control program 1206 also communicates with management server 1100 and processes management requests for importing/exporting archive contents, searching data and metadata, and for reading/updating default policies defined by the administrator on the management server 1100.

One of data storage devices 1210 is illustrated in FIG. 1 as containing management information including a metadata table 1301, a default policies table 1302, a user table 1303, a search index 1304, a private key 1305, and a public key 1306. The details of each of these tables are described later. Further, while the management information is illustrated as being stored in a separate disk drive 1210 from data 1307, this information may alternatively be stored in the same disk drive 1210, or across multiple disk drives 1210. Additionally, the management tables will typically be loaded into memory 1202 during operation of storage system 1200 in order to reduce access latency. Also, private key 1305 may be used to create a digital signature to be included with data exported, and public key 1306 may be used to verify a digital signature on data imported in a manner known in the art.

Disk drives 1210 provide physical storage mediums for creating one or more logical volumes on which file systems may be created for storing data 1307 as files. For example, one disk drive 1210 may be shared by multiple logical volumes containing one or more file systems and/or one logical volume containing one or more file systems can span multiple disk drives 1210, such as an array group in a RAID array, or the like.

Figure 2A:
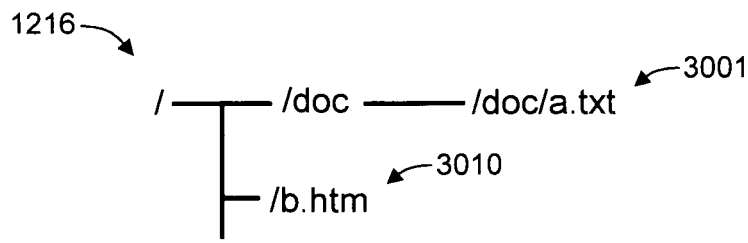
FIG. 2A illustrates an exemplary data structure of a data file system for storing data.
Figure 2B:
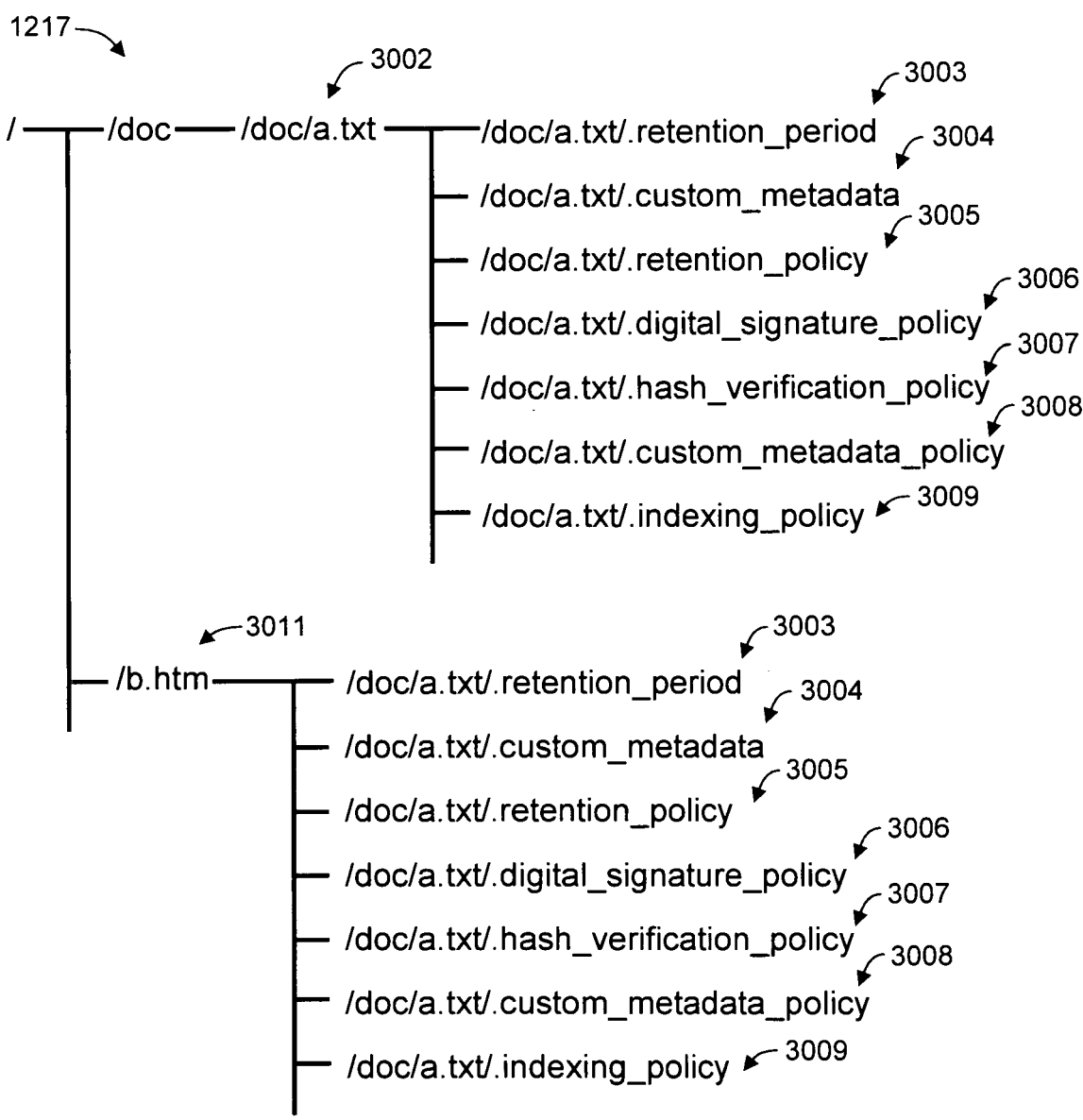
FIG. 2B illustrates an exemplary data structure of a metadata file system for storing metadata.

As illustrated in FIGS. 2A-2B, storage system 1200 may export two file systems for use by clients 1000, namely, a data file system 1216, which represents how data 1307 is stored in the storage system, and a metadata file system 1217, which represents metadata files in the storage system. The physical capacity of the data file system 1216 may be provided through an internal file system in a volume on one or more of disk drives 1210. The metadata file system 1217 may be a virtual file system for exporting metadata contained in management tables as files. For each data file in the data file system 1216, the metadata file system 1217 has a directory which contains one or more metadata files. However, it is not necessary to create actual files for the metadata, as the metadata is contained in the metadata table 1301, the default policies table 1302, the user table 1303, and the search index 1304. As discussed further below, the virtual metadata file system 1217 enables clients to access the metadata information as if accessing a file, for example, by using a READ or WRITE command.

In this embodiment, the name of the directory in the metadata file system 1217 is the same as the name of the data file in the data file system 1216. For example, as illustrated in FIG. 2A, a data file system 1216 is created having a first data file 3001 having a file path/name "/doc/a.txt". As illustrated in FIG. 2B, in the metadata file system 1217 there is a corresponding directory 3002 named "/doc/a.txt" which contains metadata files of the file "/doc/a.txt" 3001. Thus, a client can see a number of metadata files in the metadata file system that correspond to each data element in the data file system. In the illustrated embodiment, for first data file 3001, a client can see seven metadata files, namely a "retention_period" 3003, which contains a retention period for the data, namely, a period of time during which the data is to be preserved (i.e., not deleted or changed); a "custom_metadata" 3004, which contains metadata specified by clients; a "retention_policy" 3005, which contains information about a quality of a data retention service and which defines a maximum retention period allowed for the data; a "digital_signature_policy" 3006, which contains information about a quality of an import/export service, and which defines whether or not the data should be exported together with a digital signature; a "hash_verification_policy" 3007, which contains information about a quality of a data corruption detection service, and which defines a frequency with which to verify a hash value to detect data corruption; a "custom_metadata_policy" 3008, which contains information about a quality of service to enable storing of custom metadata, and which defines a maximum size of custom metadata allowed for the particular data; and an "indexing_policy" 3009, which contains information about a quality of an indexing service, and which defines whether or not the data is indexed to make the data searchable. Similarly, a second file 3010, named "/b.htm" is illustrated in data file system 1216 and has in metadata file system 1217 a corresponding directory 3011 named "/b.htm" that includes seven metadata files 3003-3009 for second data file 3010. Of course, any number of files may be stored in data file system 1216, and corresponding entries can be made in virtual metadata file system 1217.

Management of Metadata and User

As illustrated in FIG. 3, metadata table 1301 contains, for each data identified by a unique identifier 2001, the following: an internal path 2002, which is a path to the data in disk drive 1210; a creation time 2003 showing the time when the data was created or stored to the storage system; a retention period 2004, which defines a minimum retention period during which the data cannot be deleted or changed; a hash value 2005, which was calculated by using cryptographic hash function; a custom metadata 2006; a digital signature 2007 of the data; a retention policy 2008, which defines a maximum retention period for the data, after which the data is to be deleted; a digital signature policy 2009, which defines whether storage system control program 1206 creates a digital signature for the data; a hash verification frequency policy 2010, which defines a frequency for verifying the hash value; a custom metadata policy 2011, which defines a maximum size allowed for custom metadata to be stored for the data; an indexing policy 2012, which defines whether or not storage system control program 1206 indexes the data; a digital signature flag 2013, which indicates whether or not the digital signature should be updated; and an index flag 2014, which indicates whether or not the search index should be updated for the particular data.

It should be noted that there are two values (metadata) related to data retention (i.e., retention period 2004 and retention policy 2008 in FIG. 3). Retention period 2004 defines the period during which the data must be preserved, i.e., must not be changed or deleted. However, this value can be changed (e.g., extended) by a client. Retention policy 2008 defines the upper limit of the retention period 2004. For example, if the retention policy 2008 of certain data is 5 years, a client can extend the retention period 2004 of the data up to 5 years. The retention policy 2008 can be changed by a client only if the client has appropriate privilege, such as by changing the terms of the contract with the storage service provider. Thus, retention policy 2008 is a policy which defines the quality of service about data retention for each client, namely, the length of time for which the client is paying to store the data.

In this embodiment, data ID 2001 is a path and file name of the data in the data file system 1216. On the other hand, if the storage system is a CAS system, a content address of the data can be used as data ID 2001. Further, if the time specified as the retention period 2004 has not elapsed since the creation time 2002, storage system control program 1206 does not modify or delete the file even if a client requests it to do so. Also, when no custom metadata has been stored, custom metadata entry 2006 is set to "N/A". Further, when storage system control program 1206 does not need to create a digital signature, digital signature entry 2007 is set to "N/A". Digital signature policy 2009 and indexing policy 2012 can be "YES" or "NO". A "YES" entry means that the service is applied to the data, while a "NO" means that the digital signature service is not applied to the data. Hash verification policy 2010 can be a positive integer, where a smaller value means more frequent verification, or may represent a time period, such as a number of weeks or months between verification processes. Digital signature flag 2013 and index flag 2014 can be a "YES" or "NO". A "YES" entry means that the digital signature or index should be updated because the data has been updated, while a "NO" entry means that there have been no updates to the data that require the digital signature or index to be updated.

As illustrated in FIG. 4, default policies table 1302 contains, for each user identified by a unique identifier 4001, a default retention period 4002, a default retention policy 4003, a default digital signature policy 4004, a default hash verification frequency policy 4005, a default custom metadata policy 4006, and a default indexing policy 4007. The user ID 4001 may be an IP address of a user, a user ID or group ID, or the like. Thus, a "user" could be an individual, a group, a corporation or other client that stores data in the storage system. If the user creates a data element in the storage system, these default values are typically used as the metadata of the new data element. Further, as discussed below, a user may be able to change each of these quality of service variables if the user has sufficient permission, as set forth in the user table 1303. Thus, the quality of service for each data element is controlled according to policies established for the user/owner of the data.

Figure 5:
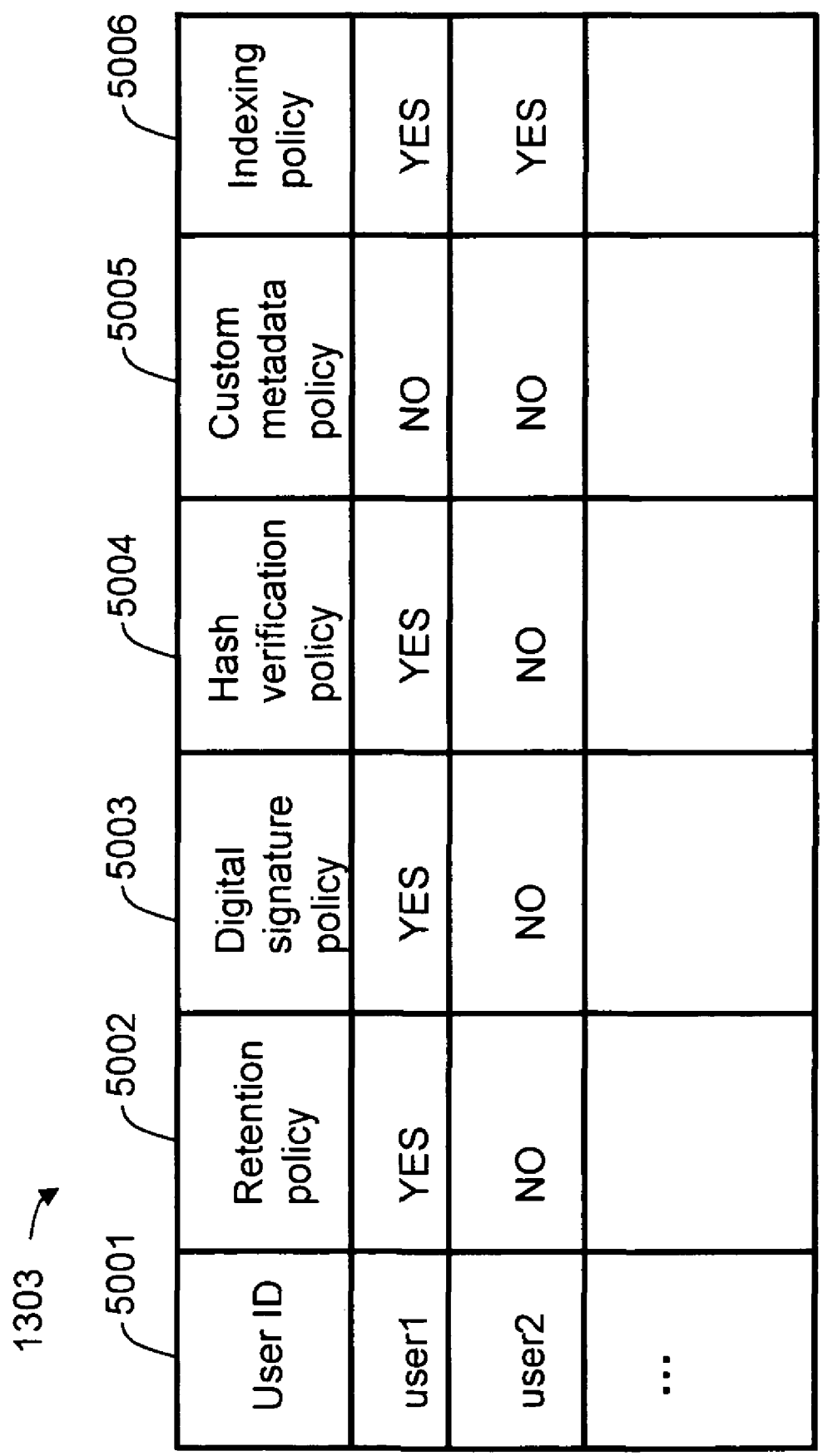
FIG. 5 illustrates an exemplary data structure of a user table.

As illustrated in FIG. 5, user table 1303 contains, for each user identified by a user ID 5001, an indication of permission to modify retention policy 5002, an indication of permission to modify digital signature policy 5003, an indication of permission to modify hash verification policy 5004, an indication of permission to modify custom metadata policy 5005, and an indication of permission to modify indexing policy 5006. These values can be "YES" or "NO". "YES" means the user can modify the corresponding metadata, while a "NO" indicates that the user cannot modify the corresponding metadata. Thus, through use of this metadata, the storage system enables user permissions to be individually controlled for each type of service set forth in the user table. For example a particular user might be able to change the frequency with which hash verification is performed on data owned by the user, but might not be able to change the retention policy applicable to the data because of regulatory guidelines.

As illustrated in FIG. 6, search index 1304 contains, for each search keyword, an entry 6001 listing the keyword and one or more data IDs 6002 of data that contains the keyword or is otherwise associated with the keyword. Search index 1304 can be used to enable a user to locate files which contain specified keywords or files that have been associated with specified keywords. The details of methods for creating search index 1304 and searching for data by using search index 1304 are not described further because they are well-known in the art.

Process Flow of the Storage System Control Program

Figure 7:
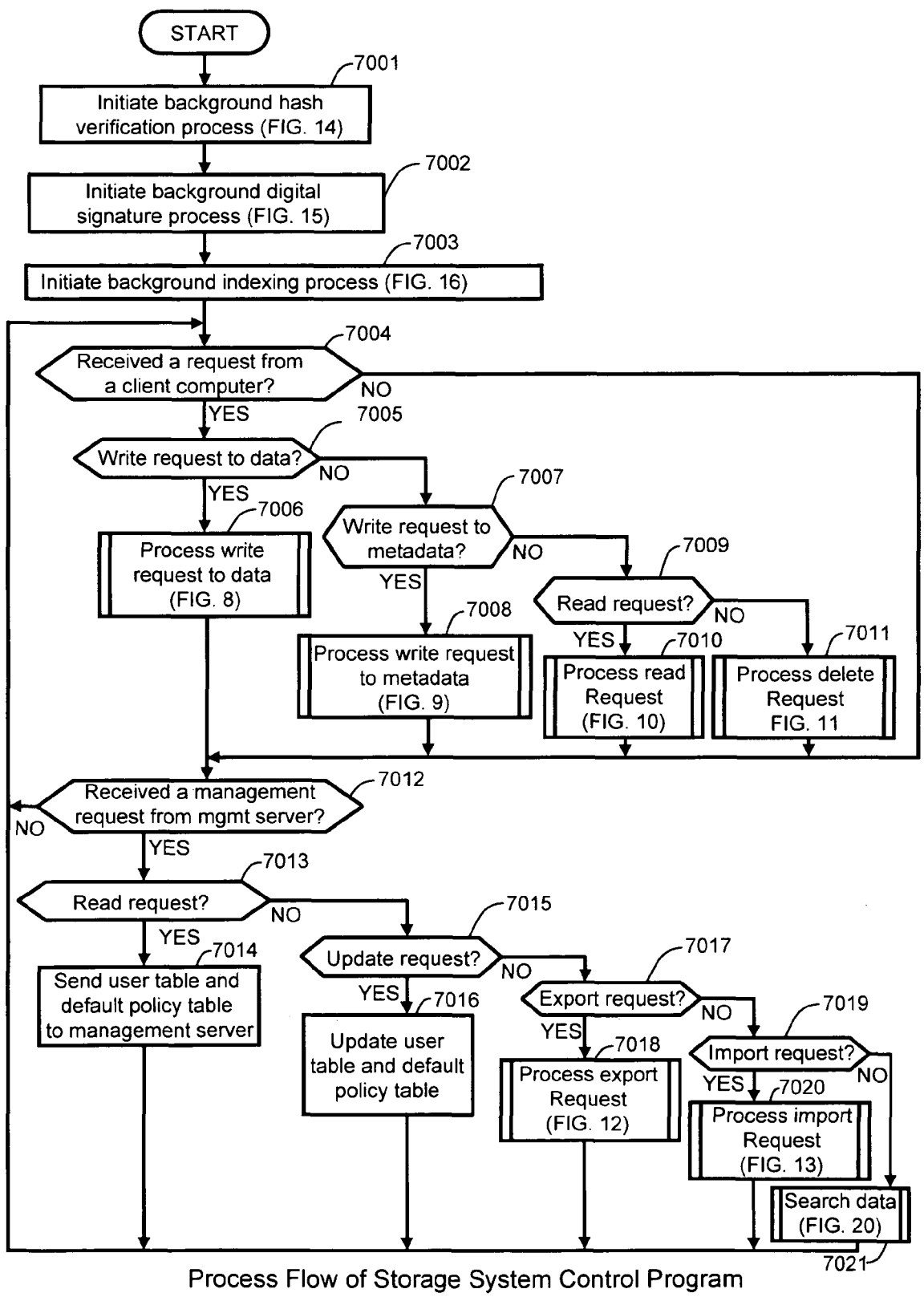
FIG. 7 illustrates an exemplary process flow of a storage system control program.

FIG. 7 illustrates an exemplary process flow of storage system control program 1206 in the first embodiments of the invention.

Figure 14:
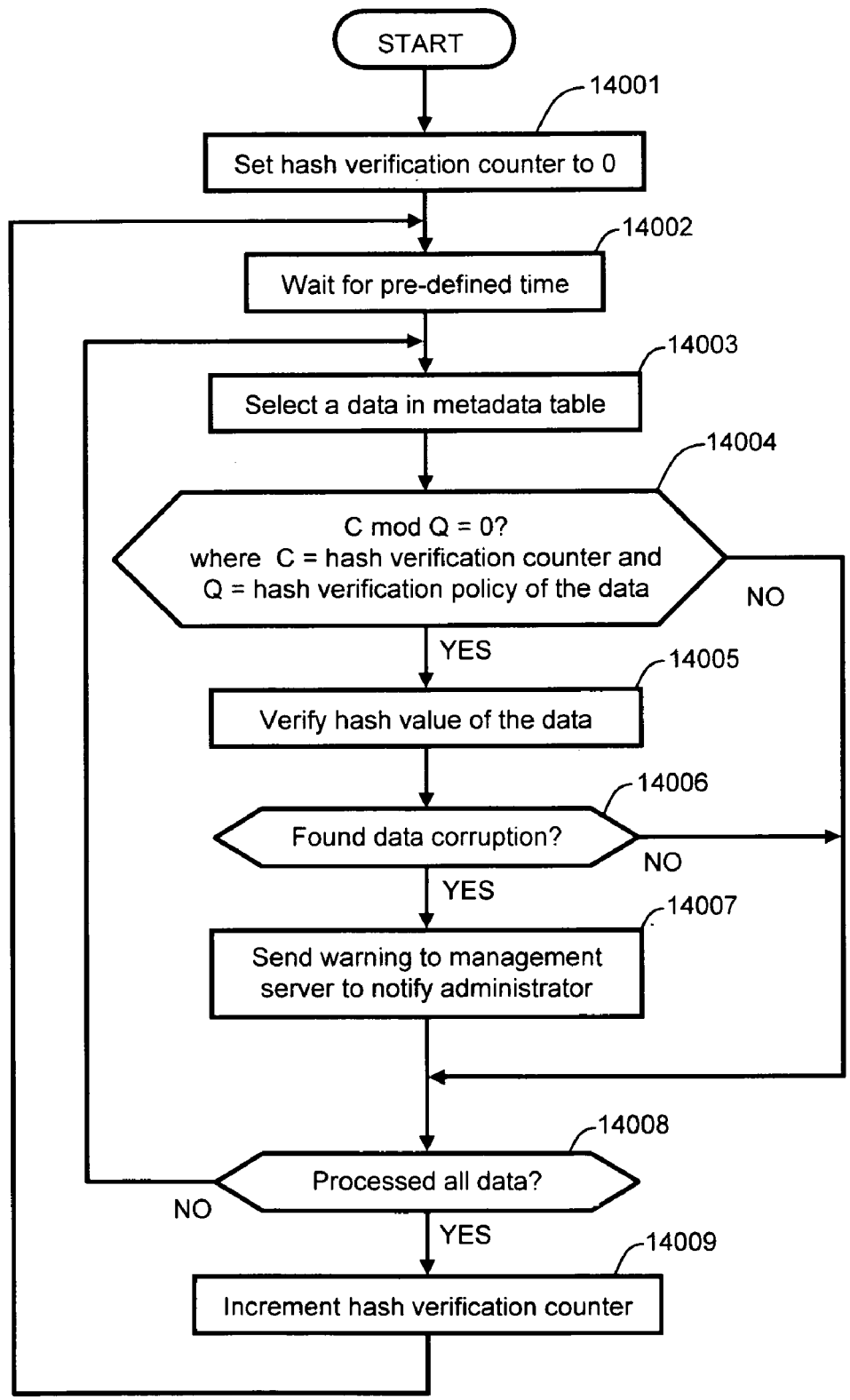
FIG. 14 illustrates an exemplary process flow for a background hash verification process.
Figure 15:
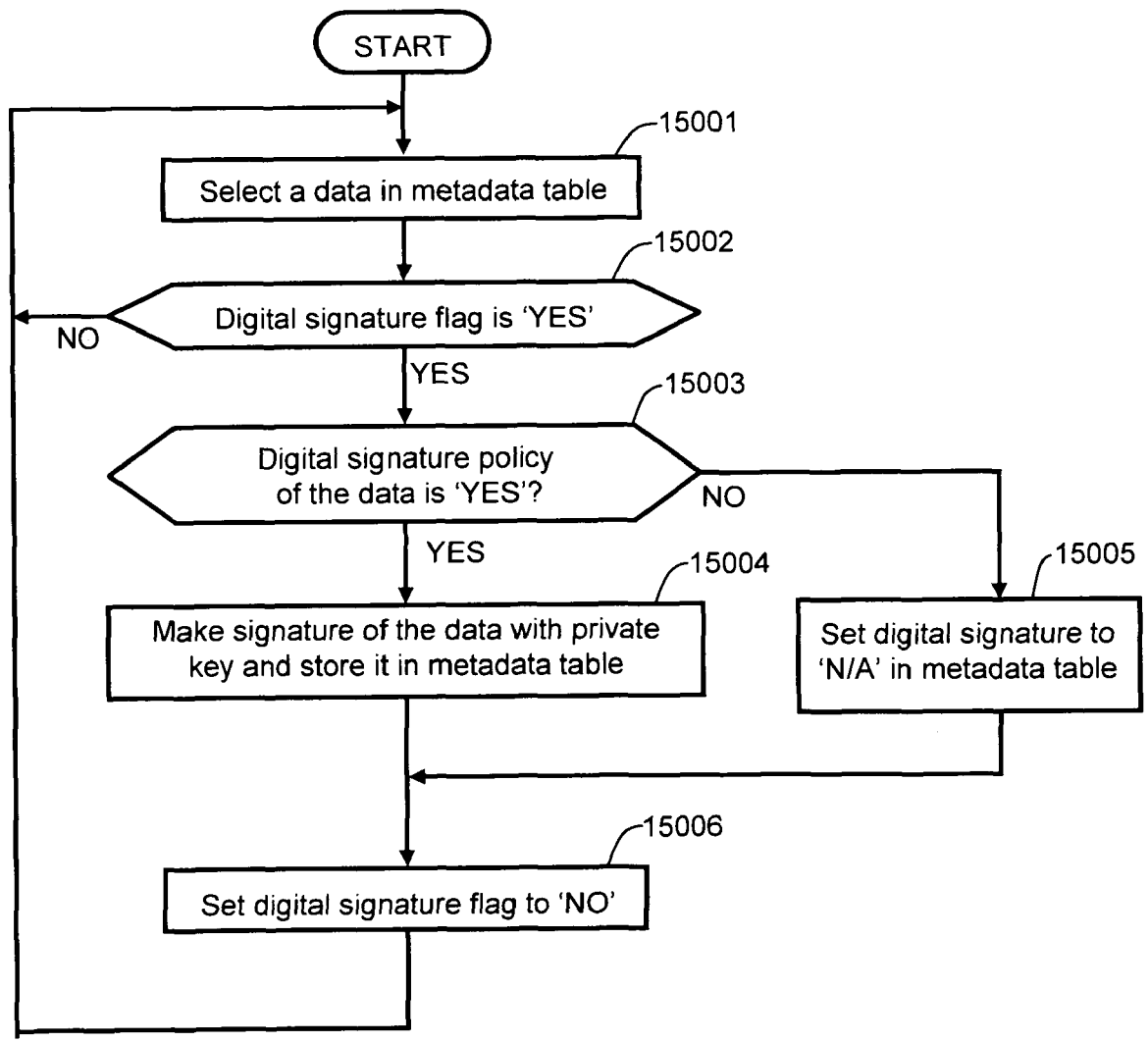
FIG. 15 illustrates an exemplary process flow for a background digital signature process.
Figure 16:
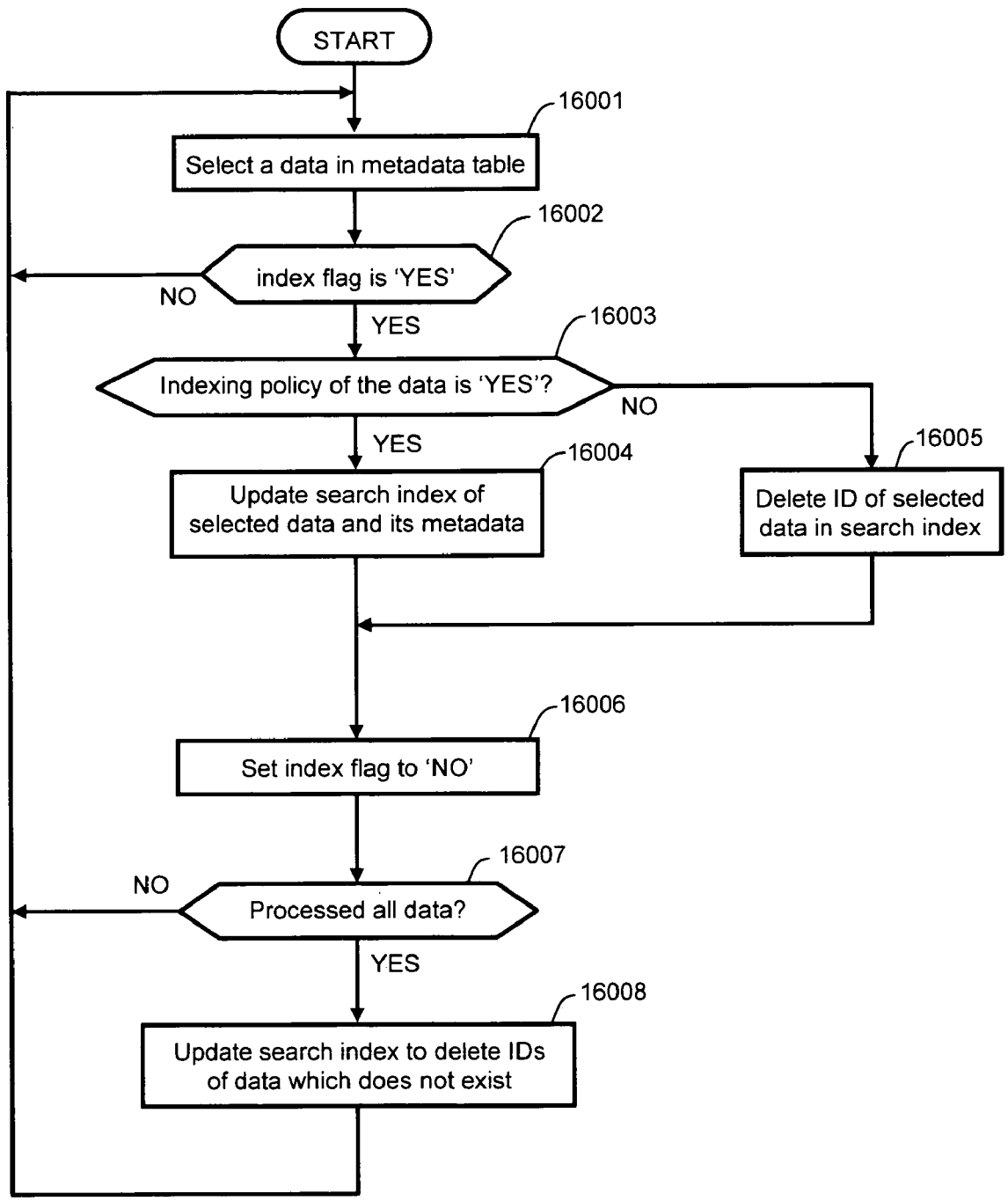
FIG. 16 illustrates an exemplary process flow for a background indexing process.

Initially, in steps 7001, 7002 and 7003, storage system control program 1206 initiates background processes for verifying hash values, updating digital signatures, and updating the search index, respectively. An exemplary background process for verifying hash values is illustrated in FIG. 14, and is described further below. An exemplary background process to update the digital signature is illustrated in FIG. 15, and is described further below. An exemplary background process to update the search index is illustrated in FIG. 16, and is described further below.

At step 7004, storage system control program 1206 processes a received request to determine whether the request is from a client computer. When the storage system control program 1206 receives an I/O operation from a client computer, according to the invention, the I/O operation will normally be one of a WRITE, READ, or DELETE request, and the process goes to step 7005. On the other hand, if the received request is not from a client computer, the process skips to step 7012.

At step 7005, the process determines whether the received request is a WRITE request to data. Storage system control program 1206 can identify whether the request is to data or metadata by the type of file system specified in the request, e.g., whether the request is to data file system 1216 or virtual metadata file system 1217.

At step 7006, when the request is a WRITE request to data, the request is processed according to the exemplary process flow for a WRITE request to data set forth in FIG. 8, and as described further below.

At step 7007, the process determines whether the received request is a WRITE request to metadata.

At step 7008, when the request is a WRITE request to metadata, the request is processed according to the exemplary process flow for a WRITE request to metadata as set forth in FIGS. 9A-9C, and as described further below.

At step 7009, the process determines whether the received request is a READ request.

At step 7010, when the request is a READ request, the request is processed according to the exemplary process flow for a READ request as set forth in FIGS. 10A-10B, and as described further below.

At step 7011, the request is determined to be a DELETE request, so the request is processed according to the exemplary process flow for a DELETE request as set forth in FIG. 11, and as described further below.

At step 7012, the process determines whether the request was received from the management server 1100. If the request was not received from a client 1000 or the management server 1100, then it is not a request to be processed under the invention.

At step 7013, the process determines whether the request is a READ request.

At step 7014, when the request is a READ request, storage system control program 1206 reads the current default policies table 1302 and user table 1303 from disk drive 1210 or memory 1202, and sends this information to management server 1100 in response to the READ request.

At step 7015, the process determines whether the request is an UPDATE request.

At step 7016, when the request is an UPDATE request, the process updates the current default policy table 1302 and/or the current user table 1303 in accordance with the new default policies or permissions set forth in the request. For example, a new retention period might be specified for the default retention policy 4003 in default policies table 1302 or user permissions might be changed in user table 1303.

At step 7017, the process determines whether the request is an EXPORT request.

At step 7018, when the request is an EXPORT request, the request is processed according to the exemplary process flow for an EXPORT request set forth in FIG. 12, and as described further below.

At step 7019, the process determines whether the request is an IMPORT request.

At step 7020, when the request is an IMPORT request, the request is processed according to the exemplary process flow for an IMPORT request set forth in FIG. 13, and as described further below.

At step 7021, when the request is not an IMPORT request, the process treats the request as a search request, and searches for and returns the requested data using the search index of FIG. 6 and the process set forth in FIG. 20 described below.

Processing of I/O Requests Sent from Clients

Figure 8:
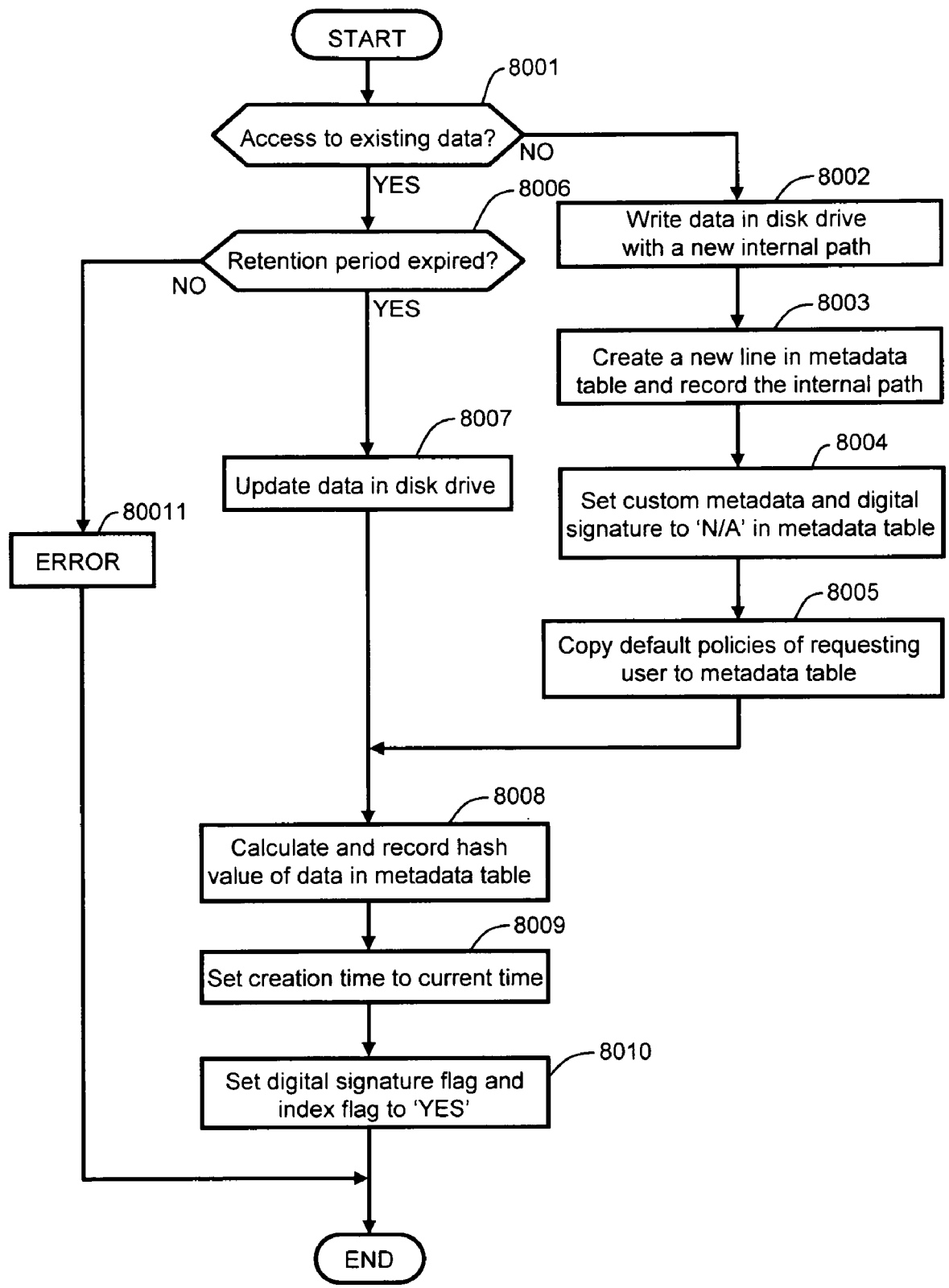
FIG. 8 illustrates an exemplary process flow for processing a data WRITE request.

FIG. 8 illustrates a detailed flow of an exemplary process carried out for a WRITE request to data sent from a client computer (step 7006 in FIG. 7).

In step 8001, storage system control program 1206 identifies whether or not the data already exists by searching for the specified data ID in the metadata table 1301.

At step 8003, when the file does not already exist, storage system control program 1206 writes the data into disk drive 1210 with a new internal path.

At step 8003, when the file does not already exist, storage system control program 1206 also creates a new line in metadata table 1301 with the internal path used in step 8003 and the data ID specified in the WRITE request.

In step 8004, storage system control program 1206 sets custom metadata 2006 and digital signature 2007 to "N/A" in the new line created in step 8004.

In step 8005, storage system control program 1206 copies from default policies table 1302 to metadata table 1301 the default policies (i.e., retention period 4002, retention policy 4003, digital signature policy 4004, hash verification policy 4005, custom metadata policy 4006, and indexing policy 4007) of the user which sent the WRITE request.

Otherwise, if the data specified in the WRITE request already exists, then at step 8006, storage system control program 1206 also checks whether or not the retention period of the file has expired. This is carried out by checking metadata table 1301 to determine the value of retention period entry 2004 and the creation time value 2003 in comparison with the current time to determine whether the retention period has expired. If the retention period has expired or if the retention period value is "N/A" (i.e., no retention period), then the process goes to step 8007.

In step 8007, storage system control program 1206 updates the data with the new data sent from the client in the WRITE request.

In step 8008, after the data is updated, storage system control program 1206 calculates a hash value of the new data and records the calculated hash value in metadata table 1301.

In step 8009, storage system control program 1206 records the current time as the creation time 2003 of the data in metadata table 1301.

In step 8010, storage system control program 1206 sets the digital signature flag and the index flag to "YES" because the data has been updated. This is done so that the background processes for digital signature and indexing will know to process the digital signature and index entries for this data, as described below with respect to FIGS. 15 and 16, respectively.

In step 8011, when the retention period 2004 of the data has not yet expired, storage system control program 1206 returns an error because the data cannot be changed or updated during the retention period.

Figure 9A:
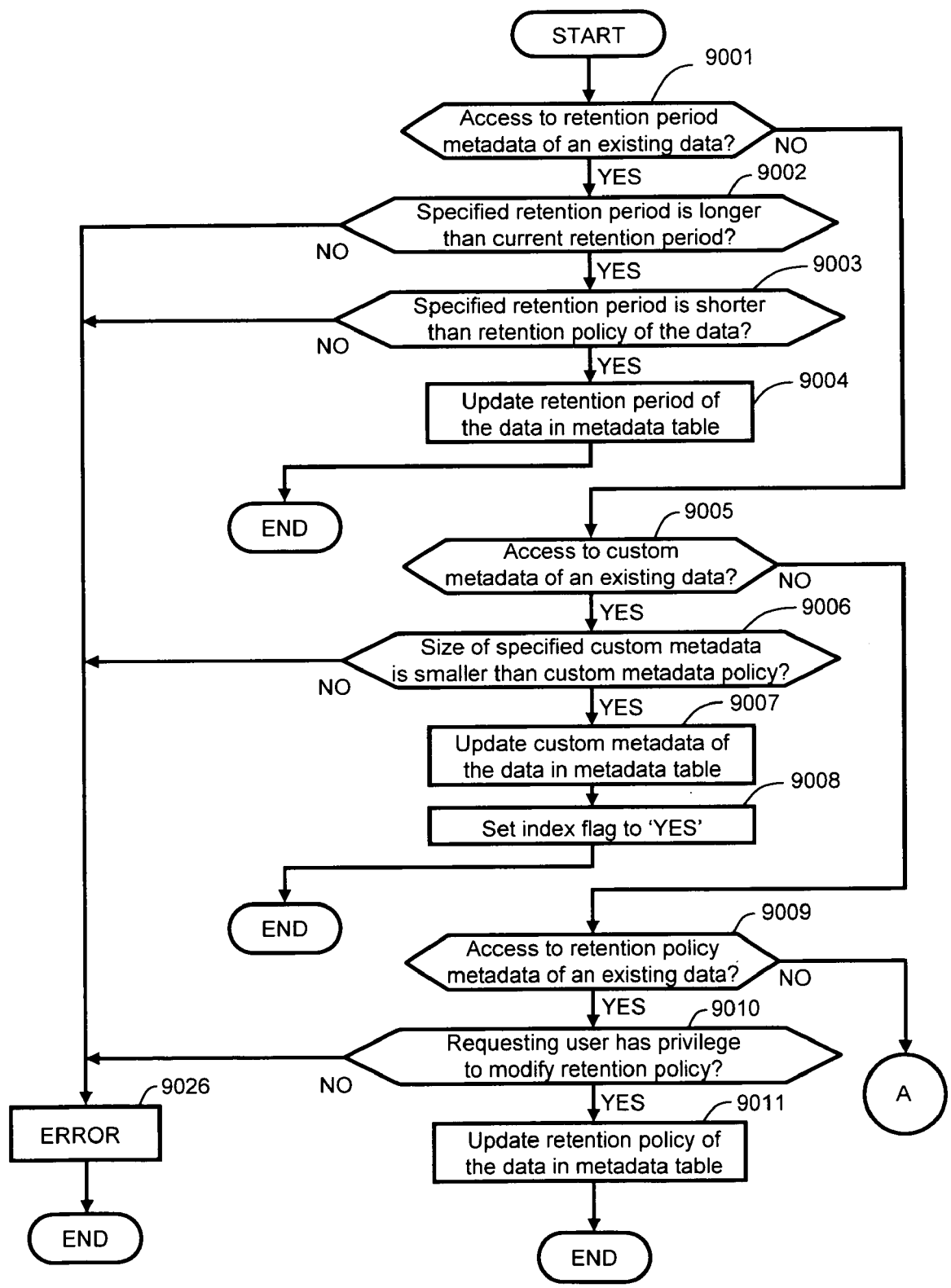
FIG. 9 illustrates an exemplary process flow for processing a metadata WRITE request.
Figure 9B:
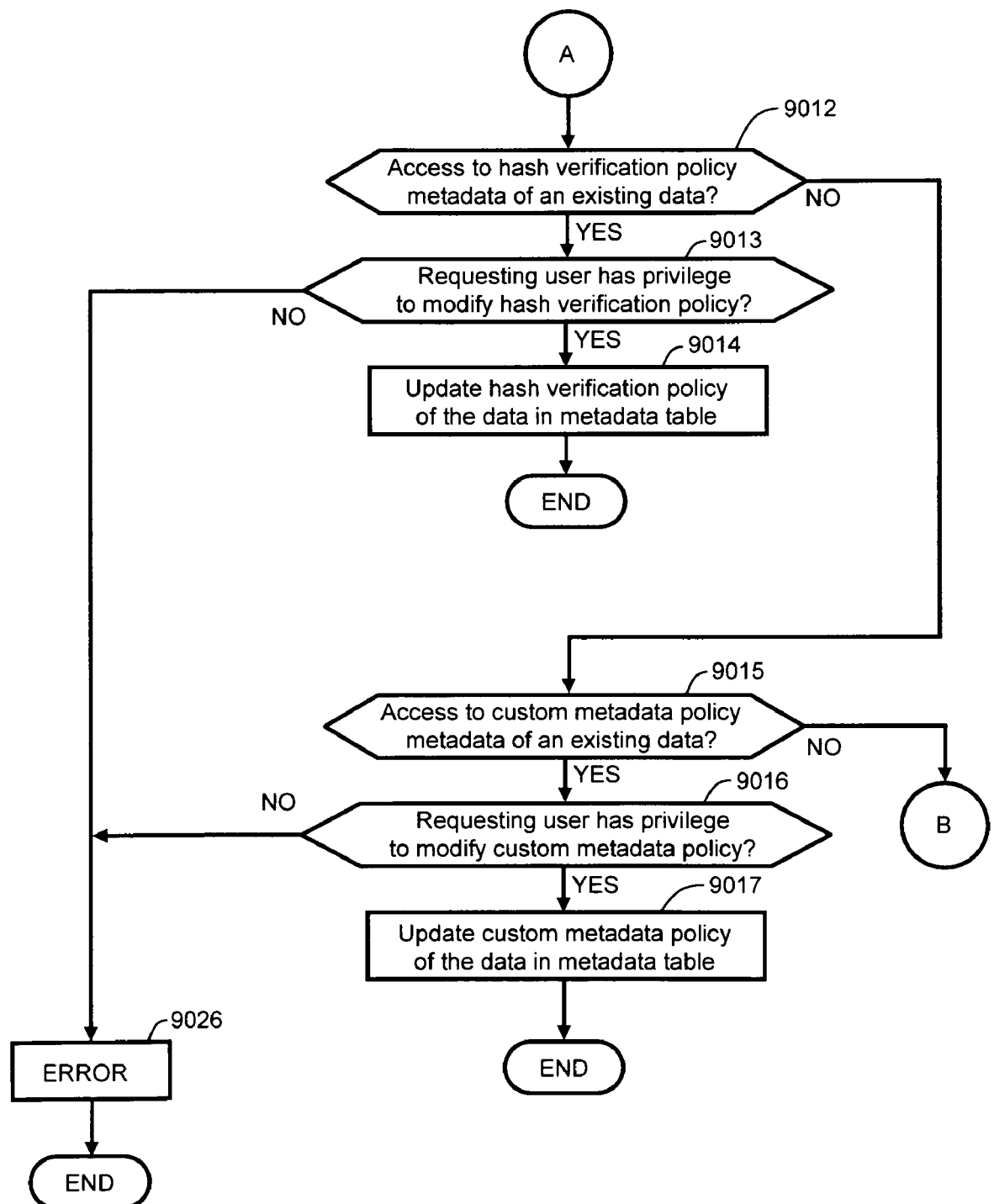
Figure 9C:
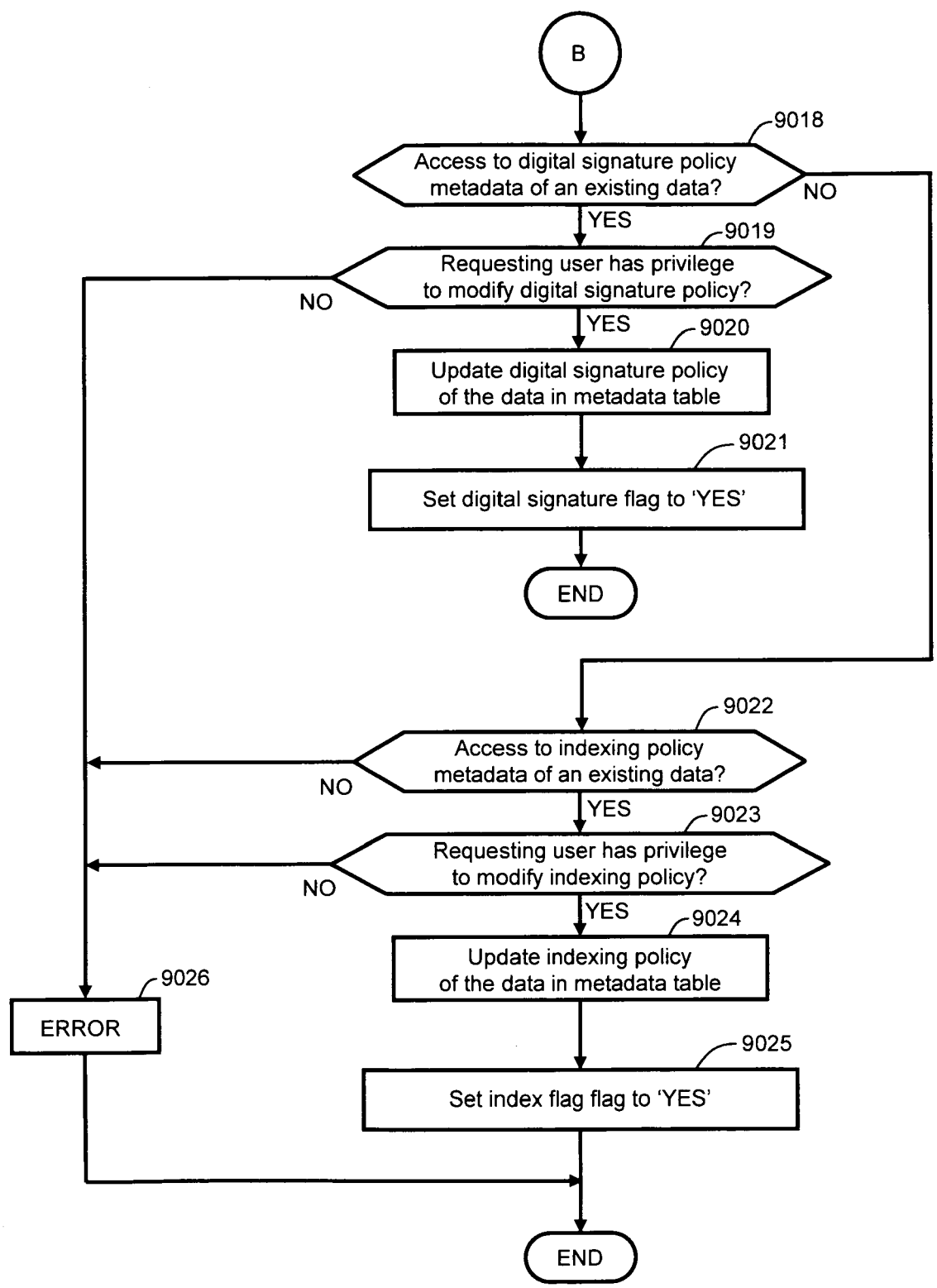

FIGS. 9A-9C illustrate a detailed flow of an exemplary process carried out for a WRITE request to metadata sent from a client computer (step 7008 in FIG. 7). As discussed above, embodiments of the invention provide a virtual metadata file system 1217, as illustrated in FIG. 2B, that enables a user to use a standard command format for a WRITE request to change the metadata for a corresponding data element. Thus, when the WRITE request is targeted to metadata instead of data, the storage system control program 1206 identifies the metadata type to be accessed by referring to the virtual metadata file name 3003-3009 included in the WRITE request.

In step 9001, storage system control program 1206 identifies the metadata file which is accessed by referring to the file name included in the WRITE request, and is also able to determine the data ID 2001 of the corresponding data in the metadata table 1301 from the pathname of the metadata file in the request. If the metadata file name is "retention_period", then the process goes to step 9002; otherwise the process skips to step 9005.

In step 9002, storage system control program 1206 checks to ensure that the new retention period specified in the WRITE request is longer than the current retention period 2004 for the corresponding data in metadata table 1301. For instance, shortening the retention period may violate a rule of data retention defined by a regulation, or the like, and therefore is not permitted.

In step 9003, storage system control program 1206 determines whether the new retention period is shorter than or equal to the retention policy 2008 for the corresponding data in metadata table 1301. The retention period of the data corresponding to the metadata must be shorter than the period specified by the retention policy 2008 in metadata table 1301 so as to prevent the data from being retained in the storage system for too long a period of time, based on the quality of service defined for the data.

In step 9004, when the conditions of steps 9002 and 9003 are satisfied, storage system control program 1206 updates the retention period 2004 of the data in metadata table 1301. Otherwise, storage system control program 1206 returns an error at step 9026.

In step 9005, storage system control program 1206 determines whether the name of the metadata file specified in the WRITE request is "custom_metadata".

In step 9006, when the name of the metadata file specified in the WRITE request is "custom_metadata", storage system control program 1206 checks the size of the new custom metadata included in the WRITE request to determine whether the size of the new custom metadata is smaller than the size specified by custom metadata policy 2011 for the corresponding data in metadata table 1301. Otherwise, storage system control program 1206 returns an error, so as to limit the size of custom metadata to the size specified by the quality of service defined for the particular data.

In step 9007, when the size of the new custom metadata is smaller than the size specified by the custom metadata policy 2011, storage system control program 1206 updates the custom metadata 2006 in metadata table 1301.

In step 9008, storage system control program 1206 sets the index flag 2014 to "YES" in metadata table 1301.

In step 9009, storage system control program 1206 determines whether the name of the metadata file included in the WRITE request is "retention_policy".

In step 9010, when the name of the metadata file included in the WRITE request is "retention_policy", storage system control program checks whether or not the requesting user has permission to modify retention policy by referring to user table 1303. If the permission for retention policy 5002 for the user identified by the user ID included in the WRITE request is "YES", then the user has permission to change the retention policy 2008 in metadata table 1301; otherwise an error is returned at step 9026.

In step 9011, when it is determined that the user has permission to change the retention policy, storage system control program 1206 updates the retention policy 2008 of the corresponding data in metadata table 1301.

In step 9012, storage system control program 1206 determines whether the name of the metadata file included in the WRITE request is "hash_verification policy".

In step 9013, when the name of the metadata file included in the WRITE request is "hash_verification_policy", storage system control program 1206 checks whether or not the requesting user has permission to modify the hash verification policy by referring to user table 1303. If the permission for hash verification policy 5004 for the user identified by the user ID included in the WRITE request is "YES", then the user has permission to change the hash verification policy 2008 in metadata table 1301; otherwise an error is returned at step 9026.

In step 9014, when it is determined that the user has permission to change the hash verification policy, storage system control program 1206 updates the hash verification policy 2010 of the corresponding data in metadata table 1301.

In step 9015, storage system control program 1206 determines whether the name of the metadata file included in the WRITE request is "custom_metadata_policy".

In step 9016, when the name of the metadata file included in the WRITE request is "custom_metadata_policy", storage system control program 1206 checks whether or not the requesting user has permission to modify custom metadata policy by referring to user table 1303. If the permission for custom metadata policy 5005 for the user identified by the user ID included in the WRITE request is "YES", then the user has permission to change the custom metadata policy 2011 in metadata table 1301; otherwise an error is returned at step 9026.

In step 9017, when it is determined that the user has permission to change the custom metadata policy, storage system control program 1206 updates the custom metadata policy 2011 of the corresponding data in metadata table 1301.

In step 9018, storage system control program 1206 determines whether the name of the metadata file included in the WRITE request is "digital_signature_policy".

In step 9019, when the name of the metadata file included in the WRITE request is "digital_signature_policy", storage system control program 1206 checks whether or not the requesting user has permission to modify retention policy by referring to user table 1303. If the permission for digital signature policy 5003 for the user identified by the user ID included in the WRITE request is "YES", then the user has permission to change the digital signature policy 2009 in metadata table 1301; otherwise an error is returned at step 9026.

In step 9020, when it is determined that the user has permission to change the digital signature policy, storage system control program 1206 updates the digital signature policy 2009 of the corresponding data in metadata table 1301.

In step 9021, when digital signature policy is updated, the digital signature flag 2013 for the corresponding data is set to "YES" to reflect the change of the digital signature policy.

In step 9022, storage system control program 1206 determines whether the name of the metadata file included in the WRITE request is "indexing_policy".

In step 9023, when the name of the metadata file included in the WRITE request is "indexing_policy", storage system control program 1206 checks whether or not the requesting user has the permission to modify the indexing policy by referring to user table 1303. If the permission for indexing policy 5006 for the user identified by the user ID included in the WRITE request is "YES", then the user has permission to change the indexing policy 2012 in metadata table 1301; otherwise an error is returned at step 9026.

In step 9024, when it is determined that the user has permission to change the indexing policy, storage system control program 1206 updates the indexing policy 2012 of the corresponding data in metadata table 1301.

In step 9025, when the indexing policy is updated, the indexing flag 2014 for the corresponding data is set to "YES" in metadata table 1301 to reflect the change of the digital signature policy.

Figure 10A:
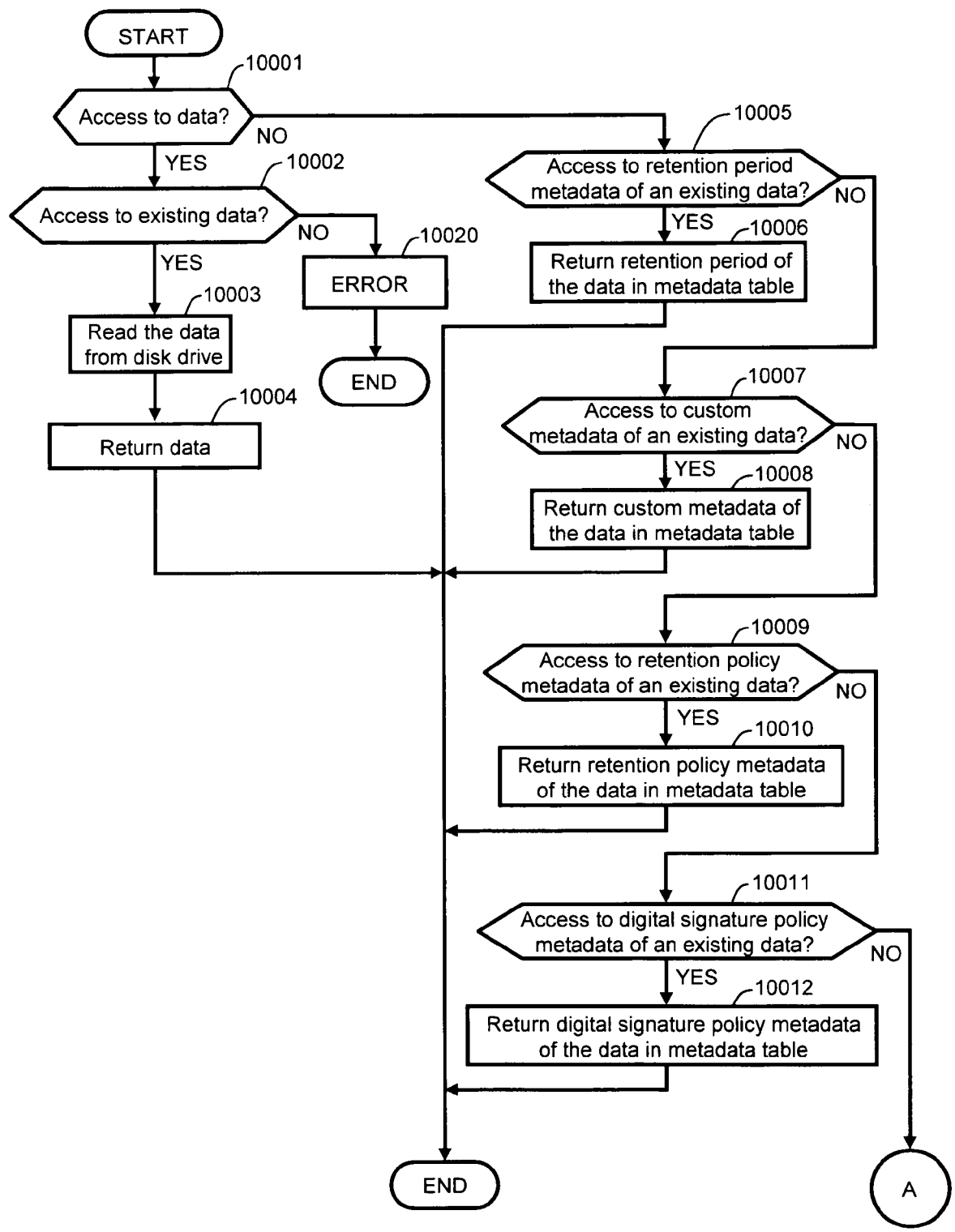
FIG. 10 illustrates an exemplary process flow for processing a READ request.
Figure 10B:
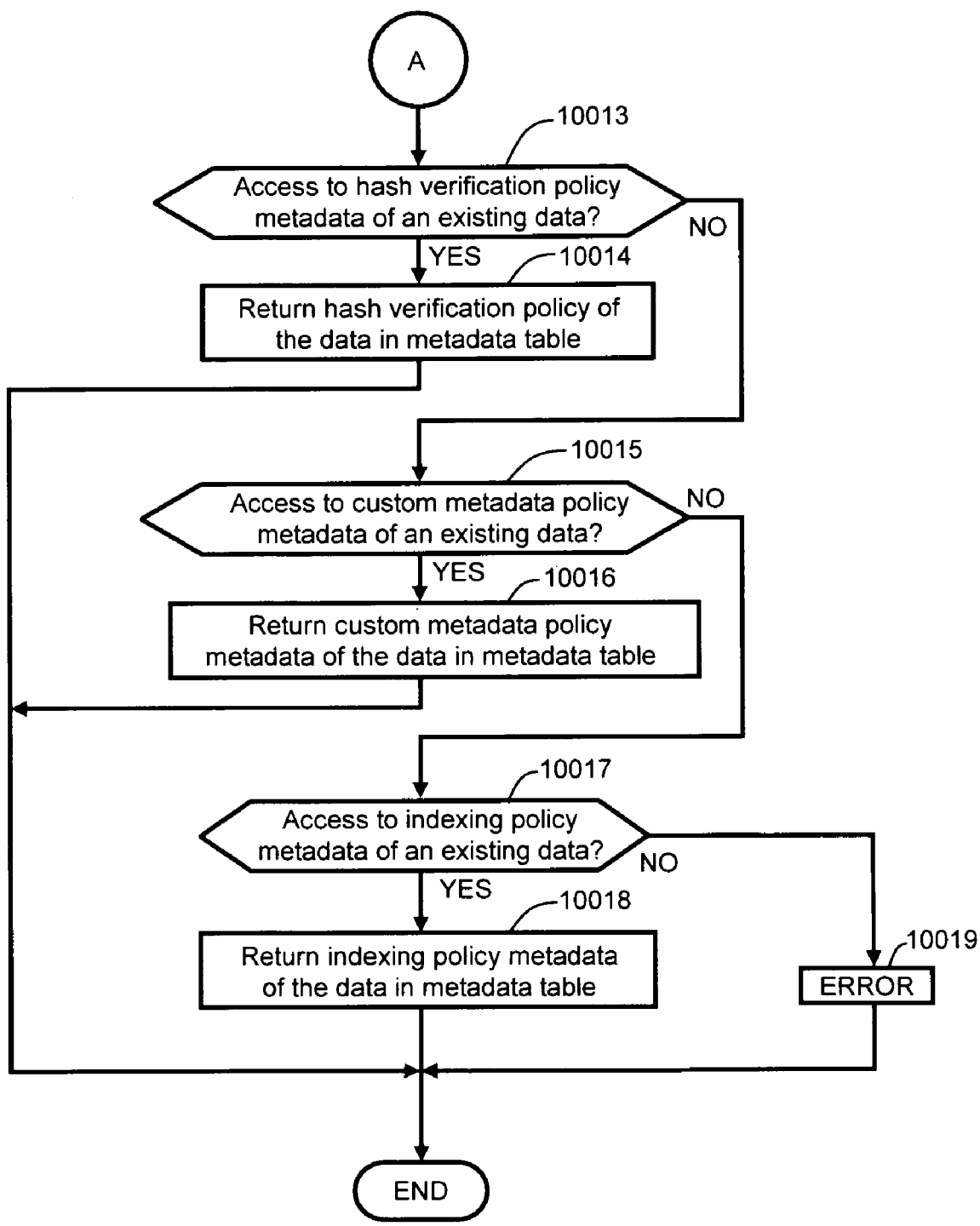

FIGS. 10A-10B illustrate an exemplary detailed flow of processing of a READ request sent from a client (step 7010 in FIG. 7).

At step 10001, storage system control program identifies the kind of data specified in the READ request, e.g., a data file or metadata file. The kind of data can be identified by determining the file system specified in the request, namely data file system 1216 for a data file or metadata file system 1217 for a metadata file.

At step 10002, when the READ request requires access to data, storage system control program 1206 identifies whether or not the data exists by searching for the specified data ID in the metadata table 1301.

At step 10003, when the specified data does exist, storage system control program 1206 reads the specified file from disk drive 1210 according to data ID 2001 and internal path 2002 in metadata table 1301. Otherwise, when the specified data does not exist, then at step 10020 storage system control program 1206 returns an error.

At step 10004, storage system control program 1206 returns the data to the requesting client.

Returning to step 10001, when the READ request is targeted to a virtual metadata file instead of a data itself, the storage system control program 1206 identifies which virtual metadata file is accessed by referring to the file name included in the READ request.

At step 10005, storage system control program 1206 determines whether the READ request is to read the retention period 2004 of an existing data.

At step 10006, when the READ request is to read the retention period 2004 of an existing data, storage system control program 1206 returns the retention period 2004 of the corresponding data in metadata table 1301. The retention period in metadata table 1301 for the corresponding data can be found by searching data ID 2001 or internal path 2002 to locate the path name of the metadata file specified in the request.

At step 10007, storage system control program 1206 determines whether the READ request is to read the custom metadata 2006 of an existing data.

At step 10008, when the READ request is to read the custom metadata 2006 of an existing data, storage system control program 1206 returns the custom metadata 2006 of the corresponding data in metadata table 1301. The custom metadata 2006 in metadata table 1301 for the corresponding data can be found by searching data ID 2001 or internal path 2002 to locate the path name of the metadata file specified in the request.

At step 10009, storage system control program 1206 determines whether the READ request is to read the retention policy 2008 of an existing data.

At step 10010, when the READ request is to read the retention policy 2008 of an existing data, storage system control program 1206 returns the retention policy 2008 of the corresponding data in metadata table 1301. The retention policy 2008 in metadata table 1301 for the corresponding data can be found by searching data ID 2001 or internal path 2002 to locate the path name of the metadata file specified in the request.

At step 10011, storage system control program 1206 determines whether the READ request is to read the digital signature policy 2009 of an existing data.

At step 10012, when the READ request is to read the digital signature policy 2009 of an existing data, storage system control program 1206 returns the digital signature policy 2009 of the corresponding data in metadata table 1301. The digital signature policy 2009 in metadata table 1301 for the corresponding data can be found by searching data ID 2001 or internal path 2002 to locate the path name of the metadata file specified in the request.

At step 10013, storage system control program 1206 determines whether the READ request is to read the hash verification policy 2010 of an existing data.

At step 10014, when the READ request is to read the hash verification policy 2010 of an existing data, storage system control program 1206 returns the hash verification policy 2010 of the corresponding data in metadata table 1301. The hash verification policy 2010 in metadata table 1301 for the corresponding data can be found by searching data ID 2001 or internal path 2002 to locate the path name of the metadata file specified in the request.

At step 10015, storage system control program 1206 determines whether the READ request is to read the custom metadata policy 2011 of an existing data.

At step 10016, when the READ request is to read the custom metadata policy 2011 of an existing data, storage system control program 1206 returns the custom metadata policy 2011 of the corresponding data in metadata table 1301. The custom metadata policy 2011 in metadata table 1301 for the corresponding data can be found by searching data ID 2001 or internal path 2002 to locate the path name of the metadata file specified in the request.

At step 10017, storage system control program 1206 determines whether the READ request is to read the indexing policy 2012 of an existing data.

At step 10018, when the READ request is to read the indexing policy 2012 of an existing data, storage system control program 1206 returns the indexing policy 2012 of the corresponding data in metadata table 1301. The indexing policy 2012 in metadata table 1301 for the corresponding data can be found by searching data ID 2001 or internal path 2002 to locate the path name of the metadata file specified in the request.

At step 10019, when none of the foregoing conditions are met, storage system control program 1206 returns an error.

Figure 11:
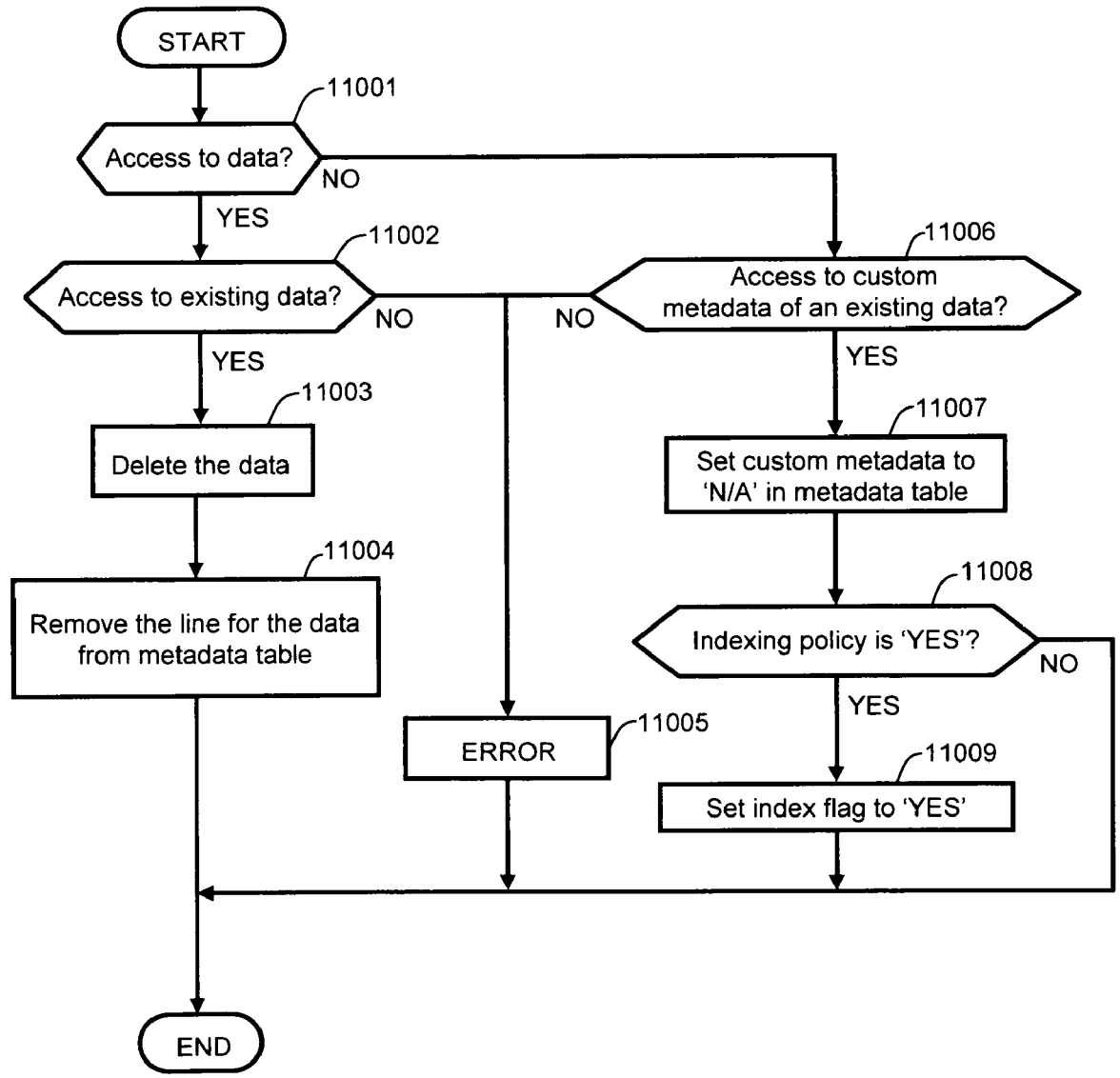
FIG. 11 illustrates an exemplary process flow for processing a DELETE request.

FIG. 11 illustrates an exemplary detailed flow of the processing of a DELETE request sent from a client (step 7011 in FIG. 7).

At step 11001, storage system control program 1206 identifies the kind of file specified in the DELETE request, i.e., a data file or metadata file. The kind of file can be identified by determining the file system specified in the request, namely data file system 1216 for a data file or metadata file system 1217 for a metadata file.

At step 11002, when the DELETE request requires access to a data file, storage system control program 1206 identifies whether or not the file already exists by searching for the specified path and file name in the internal path 2002 in metadata table 1301.

At step 11003, when the file specified in the DELETE request is located in the metadata table 1301, storage system control program 1206 deletes the data in disk drive 1210. Otherwise, when the file does not exist, the process returns an error message at step 11005.

At step 11004, storage system control program 1206 removes the line which contains information about the deleted data from metadata table 1301.

At step 11006, when the DELETE request is determined to not be for a data file in step 9001, storage system control program 1206 determines if the DELETE request is directed to deleting the custom metadata 2006 of an existing data.

At step 11007, storage system control program 1206 sets the custom metadata 2006 of the corresponding data to "N/A" in metadata table 1301.

At step 11008, storage system control program 1206 determines whether the indexing policy 2012 of the corresponding data associated with the custom metadata is "YES".

At step 11009, when the indexing policy 2012 of the corresponding data associated with the custom metadata is "YES", storage system control program 1206, sets the index flag 2014 to "YES" to reflect the deletion of custom metadata to the search index 1304.

Processing of Requests Sent from Management Server

Figure 12:
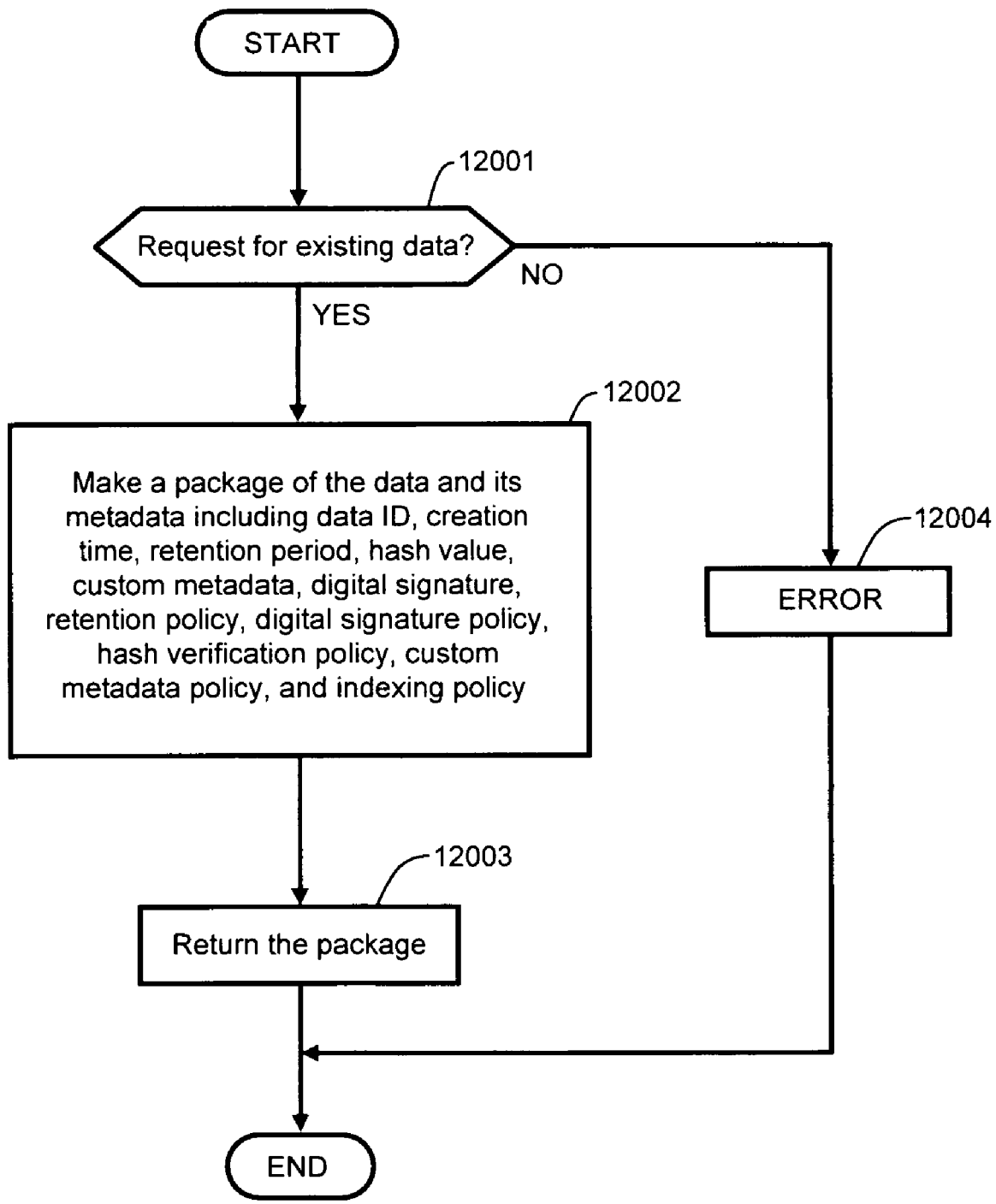
FIG. 12 illustrates an exemplary process flow for an EXPORT request.

FIG. 12 illustrates an exemplary process flow for processing of an EXPORT request sent from management server 1100 (step 7018 in FIG. 7). The EXPORT request specifies an ID of data to be exported. An EXPORT request might typically be performed as part of a data backup operation.

At step 12001, storage system control program 1206 determines whether the specified data exists by referring to metadata table 1301. When the specified data does not exist, and error is returned at step 12004.

At step 12002, storage system control program 1206 creates a package of the data and a part of its metadata recorded in metadata table 1301. The packaged metadata includes data ID 2001, creation time 2003, retention period 2004, hash value 2005, custom metadata 2006, digital signature 2007, retention policy 2008, digital signature policy 2009, hash verification policy 2010, custom metadata policy 2011, and indexing policy 2012. The format of the package of data and metadata can be an archive format such as a ZIP file, TAR file, or the like.

At step 12003, storage system control program 1206 returns the package of data and metadata to the management server. Because a digital signature is created and stored in metadata table only if digital signature policy of the data is "YES", it is ensured that data whose digital signature policy is "YES", is exported together with a digital signature.

Figure 13:
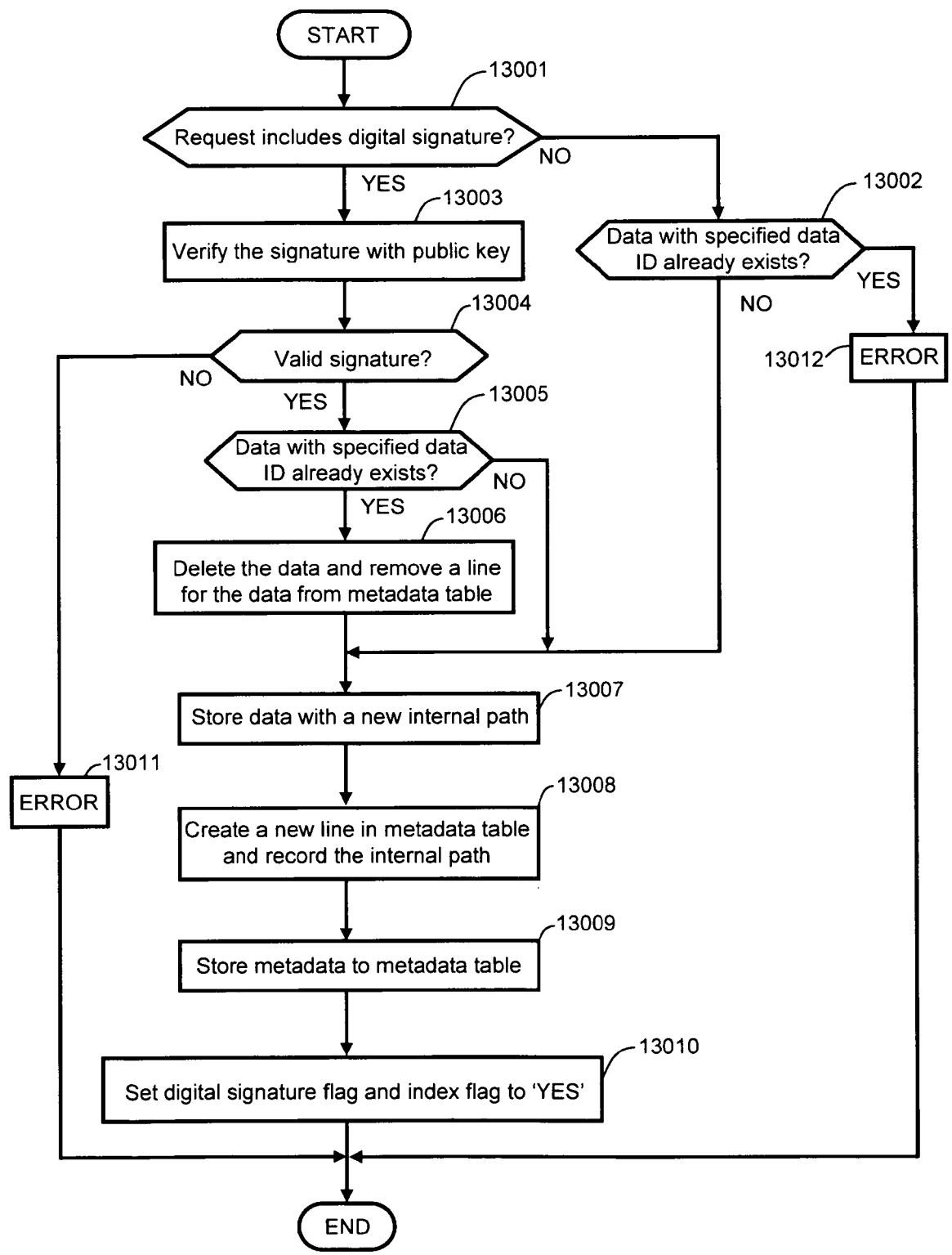
FIG. 13 illustrates an exemplary process flow for an IMPORT request.

FIG. 13 illustrates an exemplary process flow for processing of an IMPORT request sent from management server 1100 (step 7019 in FIG. 7).

At step 13001, storage system control program 1206 determines whether the data and metadata package included with the IMPORT request includes a digital signature.

At step 13002, if the package included in the IMPORT request does not contain a digital signature, then storage system control program 1206 determines whether the specified data ID already exists in the storage system by checking metadata table 1301. When the data ID already exists, then storage system control program 1206 does not overwrite the existing data and returns an error at step 13012 because storage system control program 1206 cannot verify the validity of the data to be imported. If the data ID does not already exist, then the process skips to step 13007.

At step 13003, when there is a digital signature included with the IMPORT request, storage system control program 1206 verifies the digital signature with public key 1306.

At step 13004, storage system control program 1206 determines whether the digital signature was found to be valid. If the digital signature is not valid, then at step 13011, storage system control program 1206 returns an error.

At step 13005, when the digital signature is determined to be valid, storage system control program 1206 determines whether the specified data ID already exists.

At step 13006, when the specified data ID already exists, storage system control program 1206 deletes the data in disk drive 1210 and deletes the entry for the data in metadata table 1301.

At step 13007, storage system control program 1206 stores the new data to disk drives 1210 with a new internal path.

At step 13008, storage system control program 1206 creates a new line in metadata table 1301 and records the internal path from step 13007 as the internal path entry 2002 in metadata table 1301.

At step 13009, storage system control program 1206 stores in metadata included in the package in the IMPORT command to their corresponding entries in the metadata table 1301.

At step 13010, in order to reflect the updates made by the IMPORT request, storage system control program 1206 sets digital signature flag 2013 and index flag 2014 to "YES".

Background Processes

FIG. 14 illustrates an exemplary process flow of a background hash verification process carried out by storage system control program 1206 (step 7001 of FIG. 7). The process periodically verifies the hash value for each data to detect whether data corruption has occurred. The frequency with which this process is carried out is determined for each data based on a specified quality of service in the hash verification policy metadata 2010.

At step 14001, when the process is first set up, storage system control program 1206 sets hash verification counter 1207 in memory 1202 to equal zero. Hash verification counter 1207 is used by the process to select data to be verified in each repeated process.

At step 14002, storage system control program 1206 waits until it is time to run the process, i.e., there is a wait time for running the process periodically.

At step 14003, when it is time to run the process, storage system control program 1206 selects a data from metadata table 1301 to determine whether it is time to have hash verification performed.

At step 14004, storage system control program 1206 calculates for the selected data entry in metadata table 1301 whether the formula "C mod Q" is equal to zero, where "C" is the hash verification counter value and "Q" is the hash verification policy entry 2010 of the selected data. A smaller hash verification policy 2010 "Q" means more frequent hash verification because if "C mod Q" is not equal to zero, the data is not processed.

At step 14005, when the calculated value is zero, storage system control program 1206 calculates a hash value of the selected data and compares the newly-calculated hash value with the value stored as hash value 2005 in metadata table 1301.

At step 14006, storage system control program 1206 whether the newly-calculated hash value is different from the hash value stored as hash value 2005 in metadata table 1301.

At step 14007, when the newly-calculated hash value is different from the hash value stored as hash value 2005 in metadata table 1301, storage system control program 1206 sends a warning to management server 1100 to notify the administrator that the data is corrupted.

At step 14008, storage system control program 1206 repeats steps 14003-14007 until all data entries in metadata table 1301 has been processed.

At step 14009, when all data entries in metadata table 1301 have been processed, storage system control program 1206 increments the hash verification counter 1207 and returns to step 14002 to wait until the next processing period. The foregoing steps ensure that the hash value of each data stored in the storage system is verified at certain intervals based on the quality of service defined for the particular data.

FIG. 15 illustrates an exemplary process flow for processing of the background digital signature process of storage system control program 1206 (step 7002 in FIG. 7). The process creates/updates/deletes a digital signature for each data based on digital signature policy metadata.

At step 15001, storage system control program 1206 selects a data entry in metadata table 1301 for processing.

At step 15002, storage system control program 1206 checks the digital signature flag 2013 of the selected data. If the digital signature flag 2013 is "NO", then the digital signature of the data is not updated because that means that neither the data, nor its digital signature policy has been updated, and the process returns to step 15001 to select the next data in metadata table 1301. On the other hand, when the digital signature flag 2013 of the selected data is "YES", the process goes to step 15003.

At step 15003, storage system control program 1206 determines whether the digital signature policy 2009 of the selected data is "YES".

At step 15004, when the digital signature policy 2009 of the selected data is "YES", storage system control program 1206 creates a new digital signature by using private key 1305 and stores the new digital signature in digital signature entry 2007 in metadata table 1301.

At step 15005, when the digital signature policy 2009 of the selected data is "NO", storage system control program 1206 sets digital signature entry 2007 of the data in metadata table 1301 to "N/A".

At step 15006, storage system control program 1206 clears the digital signature flag in metadata table 1301 by setting it to "NO". These steps ensure that the digital signature of each data is maintained (and exported together with the data during response to an EXPORT request) based on the quality of service defined for the particular data.

FIG. 16 illustrates an exemplary process flow of background indexing process of storage system control program 1206. This process adds/deletes index information generated from each data in search index 1304 based on indexing policy metadata. The control flow to select data to be indexed is described below but the details of the method to update the search index 1304 are well-known and not described.

At step 16001, storage system control program 1206 selects a data entry in metadata table 1301 for processing.

At step 16002, storage system control program 1206 checks the index flag 2014 of the selected data. If the index flag 2014 is "NO", then that means that neither the data, nor its indexing policy has been updated, and the process returns to step 16001 to select the next data in metadata table 1301. On the other hand, when the index flag 2014 of the selected data is "YES", the process goes to step 16003.

At step 16003, storage system control program 1206 determines whether the indexing policy 2012 of the selected data is "YES".

At step 16004, when the indexing policy 2012 of the data is "YES", storage system control program 1206 updates the search index 1304 to add to or update the index information of the data.

At step 16005, when the indexing policy 2012 of the data is "NO", storage system control program 1206 deletes the ID of the data and other related information from search index 1304.

At step 16006, storage system control program 1206 clears the search index flag by changing it to "NO".

At step 16007, storage system control program 1206, determines whether all the data in the metadata table 1301 have been processed. If not, the process returns to step 16001 to select the next data.

At step 16008, after the entries in the metadata table have been processed, the storage system control program 1206 deletes information about any other deleted data from search index, such as data deleted by step 11004 of FIG. 11. This process ensures that the search index includes index information of each data based on the quality of service defined for the data.

Figure 20:
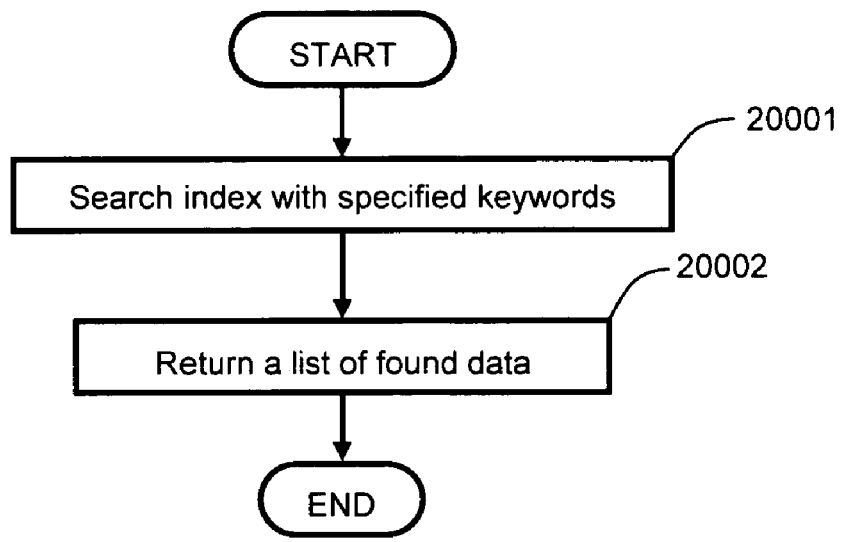
FIG. 20 illustrates an exemplary process flow for processing a search request.

FIG. 20 illustrates an exemplary process flow of processing of a SEARCH request (step 7021 in FIG. 7).

At step 20001, storage system control program 1206 searches the keywords specified in the request in index 1304.

At step 20002, storage system control program 1206 returns a list of IDs of data which contain the specified keywords. By searching the search index which the background indexing process maintains, only data which is specified to be indexed by indexing metadata will be included in the list.

By the above-described processes, services are applied to each individual stored data based on the metadata which defines the quality of service. Also, these processes allow each client to modify the quality of service based on the permissions given to the client.

Second Embodiments

In the second embodiments, data is stored into data groups or pools and the default quality of service metadata is defined for each data pool. Each pool can be an individual name space or a directory in a single name space in a storage system which has a file system interface. If the storage system is a CAS system, the pool can be a group of content addresses. In the described embodiment, the pool is a directory. The differences from the first embodiments are described below.

As illustrated in FIG. 17, a default policies table 2302 of the second embodiments contains default policies for each pool identified by pool ID 17001 instead of each user. Pool ID 17001 is a directory name in this embodiment. The remainder of default policies table 2302 is the same as in default policies table 1302 of the first embodiments. The default policies are searched in the default policies table 2302 by matching pool ID of the created data with a "longest-match" principle. For example, in FIG. 17, if a data is stored in "/doc", the policies 4002-4007 contained in the first line 17025 (and not the policies 4002-4007 contained in second line 17026 for "/") are applied.

As illustrated in FIG. 18, metadata table 2301 of the second embodiments contains a pool ID entry 18001 which is an identifier of a data pool which stores data for each data having an entry in metadata table 2301. Pool ID 18001 is used to identify the location of the data in disk drives 1210 if multiple data are stored in different pools but have the same internal path value. For example, if "pool1" is stored in a D: drive and "pool2" is stored in an E: drive, an internal path name "/path/file.txt" might be used for two different files, on stored in the D: drive and one stored in the E: drive. In this case, the drive name "D:" or "E:" is used as pool ID 18001 to distinguish two different data in "pool1" and "pool2" having the same internal path.

Figure 19:
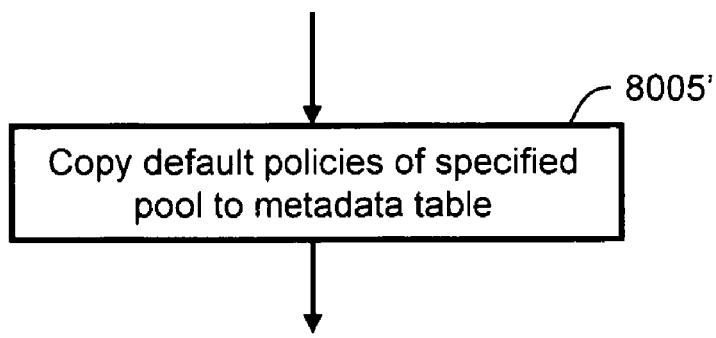
FIG. 19 illustrates a difference in the processing of a data WRITE request in the second embodiments.

As illustrated in FIG. 19, step 8005 in FIG. 8 is modified to step 8005' in FIG. 19 so that default policies defined for the pool specified in the request are copied into the metadata table 2301 instead of for the user, as in the first embodiments. The remainder of the system structure and process flows is similar to those described above with respect to the first embodiments. Thus, it may be seen that in the second embodiments, the default quality of service for each data can be defined based on the particular data pool which stores the data.

The storage system of the invention maintains metadata which defines the quality of services for each data or data pool. When the storage system applies data management functions to a particular discrete identified piece of data, the storage system is able to adjust the quality of services by referring to the metadata for that particular data element. Default values of the metadata for a particular data are defined for each client which created the data or each data group/pool to which the created data belongs. These metadata can be read by storage clients and can also be modified by clients which have sufficient privileges to set the metadata to values other than default values. This enables the service level for each data element to be individually adjusted according to its requirements. Thus, the policy for managing each data element, such as a file, is able to be controlled, based upon which user owns or is using the particular data element, thereby enabling individual control of quality of service for each data element, even when the data element is stored in same volume or file system as other data elements having a different quality of service. Such user-based or pool-based management of individual data elements enables a storage system of the invention to provide a variety of different functions and services to a number of different users who may be unrelated to each other, and who may each have quite different requirements for the storage of their data in the storage system.

From the foregoing, it will be apparent that the invention provides methods and apparatuses for changing quality of data management services for each individual data in a storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A storage system comprising:
   one or more storage devices;
   a control unit coupled to the one or more storage devices, and
   a plurality of data elements stored on the one or more storage devices, each said data element being identified by a unique identifier, and each data element having management information associated therewith for enabling management of a quality of service applied to each data element individually,
   wherein the management information is individually changeable for each data element for changing the quality of service of each data element individually without affecting the quality of service of others of the data elements,
   wherein the management information which defines the quality of service of a particular data element is changed as a result of the storage system receiving a WRITE request sent to the storage system, the WRITE request being directed to a virtual metadata file corresponding to the particular data element and specifying a new quality of service for the particular data element or specifying custom metadata for the particular data element.

2. The storage system according to claim 1,
   wherein the WRITE request received by the virtual metadata file specifies a new quality of service for the particular data element selected from: a retention period, a retention policy, a digital signature policy, a hash verification frequency policy, a custom metadata policy, and an indexing policy.

3. The storage system according to claim 2,
   wherein, when the WRITE request specifies a definition of a new quality of service, the storage system determines whether a particular user sending the request has permission to change the definition for the particular data element into the specified definition.

4. The storage system according to claim 1,
   wherein said quality of service includes at least one of: a retention period specified for each data element, a retention policy specified for each data element during which data is preserved with no change and no deletion, a digital signature policy specified for each data element, a hash verification frequency policy specified for each data element, a custom metadata policy specified for each data element, and an indexing policy specified for each data element.

5. The storage system according to claim 1,
   wherein, when a new data element is stored to the storage system, new management information is created corresponding to the new data element,
   wherein the new management information includes default management information specified for a particular user that stored the new data element to the storage system.

6. The storage system according to claim 1,
   wherein, when a computer in communication with the storage system needs to determine the quality of service of a particular data element, the computer sends a READ request to the storage system, said READ request specifying a virtual metadata file corresponding to the particular data element,
   wherein the storage system receives the READ request, identifies the corresponding data element, and returns a definition of the quality of service information regarding the particular data element.

7. The storage system according to claim 1,
   wherein, when the storage system receives a request from a computer in communication with the storage system, the storage system determines whether the request is directed to a data element or to metadata which contains a definition of the quality of service for a data element based on a file system specified in the request.

8. The storage system according to claim 1,
   wherein each data element is a data file, each said file having separate said management information associated therewith for managing the quality of service of that file.

9. The storage system according to claim 1,
   wherein, when the storage system first stores a particular data element, the storage system calculates an original hash value based upon content of the particular data element,
   wherein the storage system periodically calculates a new hash value for the particular data an compares this new hash value with the original hash value to detect any change in the particular data element,
   wherein a period at which the new hash value is calculated is individually specified for each data element in the system by said management information.

10. The storage system according to claim 1,
    wherein the quality of service for any one of the data elements is quality of data management service for the one data element;
    wherein the control unit applies data management functions to any one of the data elements with the quality of data management service for the one data element by referring to the management information for the one data element; and
    wherein the control unit is configured to adjust the quality of data management service for the one data element by referring to the management information for the one data element which is individually changeable.

11. A method of operating a storage system, comprising:
storing a plurality of data elements on the one or more storage devices in the storage system, each said data element being identified by a unique identifier;
creating management information for each individual data element and associating the management information with the corresponding data element for enabling individual management of a quality of service applied to each data element;
changing the management information for a particular data element for changing the quality of service of the particular data element individually, without changing the quality of service of others of the data elements; and
changing the management information which defines the quality of service of the particular data element as a result of receiving a WRITE request sent to the storage system, the WRITE request being directed to a virtual metadata file corresponding to the particular data element and specifying a new quality of service for the particular data element or specifying custom metadata for the particular data element.

12. The method according to claim 11,
wherein the WRITE request received by the virtual metadata file specifies a new quality of service for the particular data element selected from: a retention period, a retention policy, a digital signature policy, a hash verification frequency policy, a custom metadata policy, and an indexing policy.

13. The method according to claim 11, further including steps of
storing a new data element is stored to the storage system;
creating new management information corresponding to the new data element, wherein the new management information includes default management information specified for a particular user that stored the new data element to the storage system.

14. The method according to claim 11, further including steps of
receiving a READ request sent to the storage system, said READ request specifying a virtual metadata file corresponding to a particular data element stored on the storage system, for determining a quality of service of the particular data element;
identifying the corresponding data element by the storage system from the specified virtual metadata file; and
returning information regarding a definition of the quality of service of the corresponding data element.

15. The method according to claim 11, further including steps of
receiving an import request from a computer in communication with the storage system, wherein the import request includes a new data element and metadata containing a definition of the quality of service for the new data element;
verifying a digital signature included with the import request prior to storing the new data element when a digital signature is included with the import request; and
storing the new data element in the storage system and storing the metadata included with the import request as the management information specifying the quality of service for the new data element.

16. A storage system comprising:
one or more storage devices;
a control unit coupled to the one or more storage devices, and
a plurality of files stored on the one or more storage devices, each said file belong to one of a plurality of data pools, each said data pool being identified by a unique identifier, and each data pool having management information associated therewith for enabling management of a quality of service of each data pool individually, whereby the files contained in a data pool have a quality of service applied to the particular data pool,
wherein the management information is individually changeable for each data pool for changing the quality of service of the files contained within the data pool without affecting the quality of service of other files contained within others of the data pools in the storage system,
wherein, when a computer in communication with the storage system needs to determine the quality of service information of a particular file, the computer sends a READ request to the storage system, said READ request specifying a virtual metadata file corresponding to the particular file, and
wherein the storage system receives the READ request, identifies the corresponding file from the virtual metadata file, and returns a definition of the quality of service information regarding the particular file.

17. The storage system according to claim 16,
wherein, when a new file is stored to a particular data pool in the storage system, new management information is created corresponding to the new file,
wherein the new management information includes default management information specifying the quality of service specified for the particular data pool to which the new file is stored in the storage system.

18. The storage system according to claim 16,
wherein the quality of service of a particular file is changed as a result of a computer in communication with the storage system sending a WRITE request to the storage system, the WRITE request being directed to a virtual metadata file corresponding to the particular file and specifying a new quality of service for the particular file or specifying custom metadata for the particular file.

* * * * *